United States Patent [19]
Broome et al.

[11] Patent Number: 5,372,413
[45] Date of Patent: Dec. 13, 1994

[54] MULTI-CHANNEL VEHICLE BRAKING SYSTEM WITH MULTIPLE SUPPLY VALVES AND SKID CONTROL UNITS FOR DIFFERENT WHEELS

[75] Inventors: William S. Broome, Worcestershire; Colin F. Ross, Kidderminster, both of England

[73] Assignee: Grau Limited, Redditch, England

[21] Appl. No.: 910,355

[22] PCT Filed: Jan. 30, 1991

[86] PCT No.: PCT/GB91/00136
 § 371 Date: Aug. 27, 1992
 § 102(e) Date: Aug. 27, 1992

[87] PCT Pub. No.: WO91/11353
 PCT Pub. Date: Aug. 8, 1991

[30] Foreign Application Priority Data

Jan. 31, 1990 [GB] United Kingdom ............... 9002165
Feb. 23, 1990 [GB] United Kingdom ............... 9004106.2
Sep. 12, 1990 [GB] United Kingdom ............... 9019952.2

[51] Int. Cl.⁵ .......................... B60T 8/34; B60T 13/26
[52] U.S. Cl. ............................ 303/118.1; 303/8; 303/22.7
[58] Field of Search ............... 303/113.1, 7, 8, 22.6, 303/22.7, 35, 40, 69, 118.1, 119.2

[56] References Cited

U.S. PATENT DOCUMENTS

| | | | |
|---|---|---|---|
| 3,853,357 | 12/1974 | Hitzelberger | 303/118.1 |
| 4,175,795 | 11/1979 | Mortimer et al. | 303/118.1 |
| 4,210,370 | 7/1980 | Mortimer | 303/119.2 X |
| 4,557,527 | 12/1985 | Stumpe | 303/15 |
| 4,568,129 | 2/1986 | Stumpe | 303/7 |
| 4,643,491 | 2/1987 | McCann et al. | 303/118.1 |
| 4,903,576 | 2/1990 | Hofler et al. | 91/459 |
| 5,184,878 | 2/1993 | Woerner | 303/119.2 X |

FOREIGN PATENT DOCUMENTS

| | | |
|---|---|---|
| 0186221 | 7/1986 | European Pat. Off. . |
| 0236085A1 | 9/1987 | European Pat. Off. . |
| 0307579 | 3/1989 | European Pat. Off. . |
| 2148282 | 3/1973 | France . |
| 2522603 | 9/1983 | France . |
| 2525541 | 10/1983 | France . |
| 3628415 | 2/1987 | Germany .................. 303/119.2 |
| 1393776 | 5/1975 | United Kingdom . |

OTHER PUBLICATIONS

Figure 11:
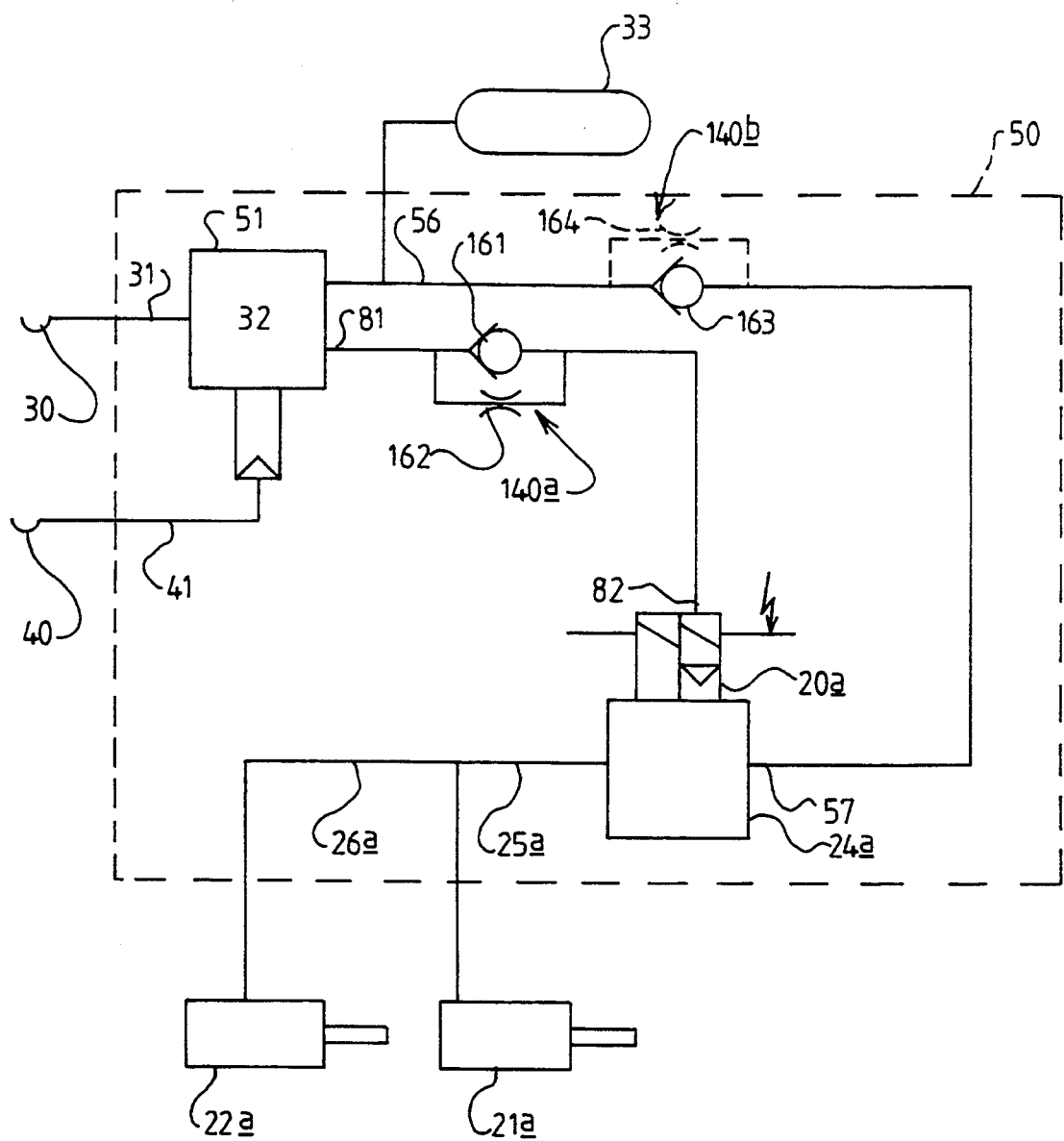

Grau Girling, Skidchek MGX, Section M/T 3, p. 9 (from Maintenance Manual), FIG. 11 Valve-At Rest Schematic, Jan. 1984.
Graubremse, Hauszeitschrift IAA-Ausgabe 1987, "GRAU Girling ABS System DGX 4S/4K".

Primary Examiner—Robert J. Oberleitner
Assistant Examiner—Jose A. Ballato
Attorney, Agent, or Firm—Leydig, Voit & Mayer, Ltd.

[57] ABSTRACT

A vehicle braking system has a controller responsive to wheel speed signals for sensing skid conditions of the wheels and for generating skid control instructions. A primary fluid pressure supply includes a fluid pressure source and a fluid pressure reservoir and wheel brakes are responsive to brake pressure supplied to the brakes by supply valves, each of which is adapted to supply fluid brake pressure to a different wheel brake or brakes from the primary supply in accordance with a brake operating signal which can be modulated by skid control units. Each pair of supply valve and skid control unit is adapted to control the fluid pressure of a different wheel brake or brakes. A plurality of brake operating signals are generated, independently of the skid control units, as a function of a brake command signal and a brake operating signal is supplied for each of the supply valves. All the components are connected together so as to be mountable on the vehicle as a discrete unit.

24 Claims, 13 Drawing Sheets

MULTI-CHANNEL VEHICLE BRAKING SYSTEM WITH MULTIPLE SUPPLY VALVES AND SKID CONTROL UNITS FOR DIFFERENT WHEELS

This invention relates to a vehicle braking system, particularly, but not exclusively, to a trailer braking system for use with a trailer adapted to be towed by a tractor vehicle.

More particularly, the invention relates to a vehicle braking system hereinafter referred to as being "of the kind specified", comprising a controller responsive to wheel speed signals for sensing skid conditions of the wheels and for generating skid control instructions, a primary fluid pressure supply including a fluid pressure source and a fluid pressure reservoir, a plurality of wheel brakes responsive to fluid pressure, hereinafter referred to as brake pressure, supplied thereto, a supply means, comprising a supply valve, for supplying brake pressure to said brakes from said primary supply in accordance with a brake operating signal, and a skid control means, controlled by said skid control instructions, comprising a skid control unit for controlling the brake pressure.

EP-A-0307579 discloses an example of a vehicle braking system of the kind specified.

The vehicle braking system of EP-A-0307579 is a "single channel" system where wheel speed sensors are provided only for one wheel on each side of the vehicle, generally the wheels of a single axle, and only a single supply valve, which is of the relay valve type, and a single skid control unit, which modulates a control signal for the relay valve, are combined together into one unit.

However, in a "multi-channel" system where wheel speed sensors are provided for a plurality of wheels on each side of the vehicle with associated respective supply valves and skid control units there have been hitherto a large number of discrete components which must be fitted separately to the vehicle with appropriate separate electrical and fluid connections both where the supply valves are relay valves or in-line valves. Such fitting is relatively complex and time consuming.

An object of the present invention is to provide a vehicle braking system of the kind specified and which provides a multi-channel facility and which is simple to fit.

According to one aspect of the present invention we provide a vehicle braking system of the kind specified wherein said supply means comprises a plurality of supply valves, each of which is adapted to supply fluid pressure to a different wheel brake or brakes, the skid control means comprises a plurality of fluid pressure skid control units, each of which is adapted to control the fluid pressure of a different wheel brake or brakes, there are provided first signal generating means to generate, independently of said skid control means, a plurality of brake operating signals as a function of a brake command signal and to supply a brake operating signal for each of said supply valves, and all said means are connected together so as to be mountable on the vehicle as a discrete unit.

The fluid pressure source may comprise a fluid pressure inlet for connection to an external source of fluid pressure and which is connected by a non-return valve means to the fluid pressure reservoir and said supply valves may supply brake pressure to said brakes from said reservoir in accordance with said brake operating signals.

The operating signals generated by said first signal generating means may be derived from said fluid pressure supplied from said primary fluid pressure supply.

The first signal generating means may comprise a relay valve to modulate said fluid pressure supplied from said primary supply as said function of the brake command signal.

The first signal generating means may comprise a load sensing valve to modulate said command signal as a function of a load carded by the vehicle.

Second signal generating means may be provided to generate a plurality of brake operating signals as a function of the fluid pressure in said fluid pressure source falling below a predetermined pressure and to supply said brake operating signal to each of said supply valves, and all said means connected together so as to be mountable on the vehicle as a discrete unit.

The operating signals generated by said second signal generating means may be derived from said fluid pressure supplied from the reservoir.

The second signal generating means may comprise a relay valve to modulate said fluid pressure supplied from said reservoir as said function of said fluid pressure in said source.

The first and second signal generating means may comprise a valve having a first port connected to said fluid pressure source, a second port connected to said reservoir, a brake command signal port to receive said brake command signal, a plurality of brake operating signal outlet ports for brake operating signals and a valve member movable in response to the pressure of said brake command signal, or the pressure in said source falling below said predetermined pressure, to modulate the fluid pressure supplied at said second port to provide said brake operating signals.

The supply valves may be in-line valves, and each brake operating signal may be supplied to a brake operating signal inlet port of a respective in-line supply valve which has a brake pressure delivery port connected to an associated wheel brake or brakes and a respective skid control unit controls the brake pressure.

Said first and second signal generating means may be provided within a first housing part provided with said first and second ports and having a brake operating signal chamber therein, said signal chamber having a plurality of brake operating signal outlet ports.

A plurality of second housing parts may be provided, each second housing part providing therein one of said in-line supply valves and one of said skid control units to control said in-line supply valve, each of said brake operating signal outlet ports being connected to the brake operating signal inlet port of the in-line valve.

Alternatively, the supply valves may be relay valves, and each brake operating signal may be supplied to a brake operating signal inlet port of a respective skid control unit and an output of each skid control unit may be connected to a control input of a respective supply relay valve, each supply relay valve having a brake pressure inlet port connected to said reservoir and a brake pressure delivery port connected to an associated wheel brake or brakes.

Said first and second signal generating means may be provided within a first housing part provided with said first and second ports and having a brake operating signal chamber and a brake pressure supply chamber therein, said signal chamber having a plurality of brake operating signal outlet ports and said brake pressure supply chamber having a plurality of brake pressure outlet ports for said brake pressure.

A plurality of second housing parts may be provided, each second housing part providing therein one of said supply relay valves and one of said skid control units to control said Supply relay valve, each of said brake operating signal outlet ports being connected to the brake operating signal inlet port of the skid control unit and each of said brake pressure outlet ports being connected to the brake pressure inlet port of a supply valve.

According to another aspect of the invention we provide a valve unit for a vehicle braking system of the kind specified comprising a first housing part containing a signal generating means to generate a plurality of brake operating signals as a function of a brake command signal and comprising a brake operating signal chamber and a plurality of brake operating signal outlet ports and a plurality of second housing parts, each containing a supply valve responsive to a brake operating signal to supply brake pressure to at least one respective wheel brake and a skid control unit to control the supply of brake pressure by said supply valve and having a brake operating signal inlet port and a brake pressure delivery port, each second housing part being removably mounted on the first housing part with said brake operating signal inlet and outlet ports interconnected.

Said first housing part may contain a second signal generating means to generate a plurality of brake operating signals as a function of the fluid pressure in said fluid pressure source falling below a predetermined pressure.

The supply valves may be in-line valves and the brake operating signal outlet ports may be connected to a brake operating signal inlet port of a respective in-line valve and a respective skid control unit modulating the brake operating signal to provide the brake pressure, each in-line supply valve having a brake pressure delivery port connected to an associated wheel brake or brakes.

Alternatively, the supply valves may be relay valves and the brake operating signal outlet ports may be connected to a brake operating signal inlet port of a respective skid control unit and an output of each skid control unit may be connected to a control input of a respective supply relay valve, each supply relay valve having a brake pressure inlet port connected to said reservoir and a brake pressure delivery port connected to an associated wheel brake or brakes.

Preferably the first housing part comprises a brake pressure supply chamber and a plurality of brake pressure outlet ports and each second housing part has a brake pressure inlet port and is mounted so that said brake pressure inlet and outlet ports are interconnected.

In both aspects of the invention:

Said first housing part may contain a control piston movably mounted in a control piston cylinder so that one side of the control piston may be acted upon by the brake command signal, a secondary piston movably mounted in a secondary piston cylinder carried by the control piston and first resilient biasing means acting between said pistons normally to bias them apart, means to supply pressure fluid from said first port to said secondary piston cylinder to act on one side of the secondary piston to bias the secondary piston towards the control piston, the secondary piston carrying a valve seat adapted sealing to engage with a valve member to control flow of fluid pressure between the brake operating signal chamber and an exhaust passage, the valve member being movable relative to a further valve seat, towards which the valve member is normally resiliently biased by a second resilient biasing means, to control flow of fluid pressure between the brake pressure supply chamber and the brake operating signal chamber, and communication means to permit fluid in said brake operating signal chamber to act on the other side of said control piston.

The exhaust passage may be provided in said movable valve member.

Said communication means may comprise a passage controlled by a pressure dependent valve so that the passage is opened only when the pressure acting in the brake operating signal chamber exceeds a predetermined pressure and preferably said predetermined pressure is adjustable.

Said first housing part and each of said second housing pans may each comprise a discrete housing and said discrete housings being releasably connected together to provide said unit.

The first housing part may be provided with a plurality, of mounting surfaces for co-operation with a mounting surface of each second housing part to enable the first and second housing parts to be releasably connected together.

The mounting surfaces may be provided by ports of at least one interconnected pair of ports such as brake operating signal inlet and outlet ports and/or brake pressure inlet and outlet ports.

In a preferred arrangement a pair of interconnected brake operating signal ports and a pair of interconnected brake pressure signal ports are provided between the first housing part and each second housing part, the pairs of interconnected ports between the first housing part and a respective second housing part being laterally spaced and the ports of one of said pairs may be interconnected to accommodate lateral variation in the juxtaposition of the ports of said one pair and the ports of the other of said pairs may be interconnected to accommodate variation in the juxtaposition of the ports of said other pair in a direction normal to said lateral direction.

One port of said one pair may comprise a transversely extending surface and the other port of said one pair may comprise an opposed transversely extending surface with a sealing means disposed therebetween and a clamping means to clamp the ports together whilst accommodating said lateral variation in juxtaposition.

The clamping means may comprise a pin extending from one port and received in a clearance opening in the other port and there being an abutment member to engage said other port.

One port of said other pair may comprise a socket and the other port of said other pair a spigot which is received within the socket with tolerance longitudinally of the socket and there being sealing means disposed between the socket and the spigot whereby said variation in juxtaposition in a normal direction is accommodated.

In an alternative arrangement the pairs of interconnected ports may be laterally spaced and the ports of each pair may be clamped together by a yoke member and the yoke members being disposed so that they are disposed on the side of their respective pair of ports which is remote from the other pair of ports.

One port of each pair may be provided with an abutment surface for engagement by the associated yoke and there being load applying means provided between the yoke and the other port of said pair whereby a clamping force can be applied between the ports through the yoke.

The whole or a major part of the abutment surface may be disposed on said side of said one port which is remote from the other pair of ports.

The yokes may each have a generally U-shaped recess therein in which said one port of each pair is received.

The load applying means may comprise a pair of screw threaded fasteners engaged with the yoke, for example, in openings in the yoke and engaged with the other part, for example, in openings in the other port.

Fluid flow control structure may be provided to influence the flow of fluid between at least two of said means to suppress unwanted fluctuations in pressure, caused by actuation of one of said means, in relation to the or any other of said means.

The fluid flow control structure may comprise a flow damping structure to permit of restricted flow in at least one direction.

The fluid flow control structure may comprise a first fluid control structure provided in the flow path of said brake operating signal between said first housing part and the or each of said skid control units.

A second fluid flow control structure may be provided in the flow path for brake pressure fluid between said first housing part and the or each of said supply valve means.

The first and/or the second flow control structure may permit of restricted fluid flow in both directions.

Alternatively, the first and/or second flow control structure may permit of restricted fluid flow in one direction and unrestricted flow in the reverse direction.

The first and/or second flow control structure may permit of said restricted flow in said one direction only when the flow rate exceeds a predetermined value.

The first fluid flow control structure may comprise a fluid flow restrictor.

If desired a one-way bypass valve, such as a check valve, may be provided in parallel with said restrictor.

The one-way by-pass may permit of free flow of fluid in the direction from the first signal generating means towards a respective skid control unit.

Alternatively, the one-way by-pass may permit of free flow of fluid in the direction from a respective skid control unit towards the first signal generating means.

The second fluid flow control structure may comprise a one-way valve, such as a check valve, to permit of free flow of fluid in the direction from the first housing part towards a respective supply valve means.

The second fluid flow control structure may comprise a fluid flow restrictor in parallel with said one way valve means to permit of restricted fluid flow in the direction from a respective supply valve means towards the first housing part.

Alternatively the first and/or second flow control structure may be provided by a device comprising means defining a chamber having an entry port and an exit port, a valve member movable therein towards and away from a valve seat defined by a continuous loop surface surrounding an exit passage connected to said exit port and disposed on the opposite side of the valve member to the entry port, means to limit movement to the valve member towards the valve seat and means to permit of limited flow of fluid past the valve member Whereby, when the rate of fluid flow demanded exceeds said limited flow the resultant pressure on the valve member moves the valve member to a position adjacent the valve seat to provide, in co-operation with the valve seat, a restriction to fluid flowing from the entry port towards the exit port, whilst fluid flow in the reverse direction causes said valve member to move away from the valve seat to permit of flow of fluid in said reverse direction which is unrestricted by said co-operation between the valve member and the valve seat.

The chamber may be generally cylindrical and the valve member may comprise a disc shaped member.

The valve seat may be annular, said exit passage being defined, at one end, by the inner edge of the annulus.

The annulus may be at the inner end of a tubular wall upstanding from one end of the chamber, and the tubular wall defining said exit passage.

The valve member may be provided with a projection or projections extending towards said one end of the chamber and arranged to limit the approach of the valve member towards the valve seat.

The valve member may be provided with an opening to permit of said limited flow of fluid past the valve member.

Figure 1:
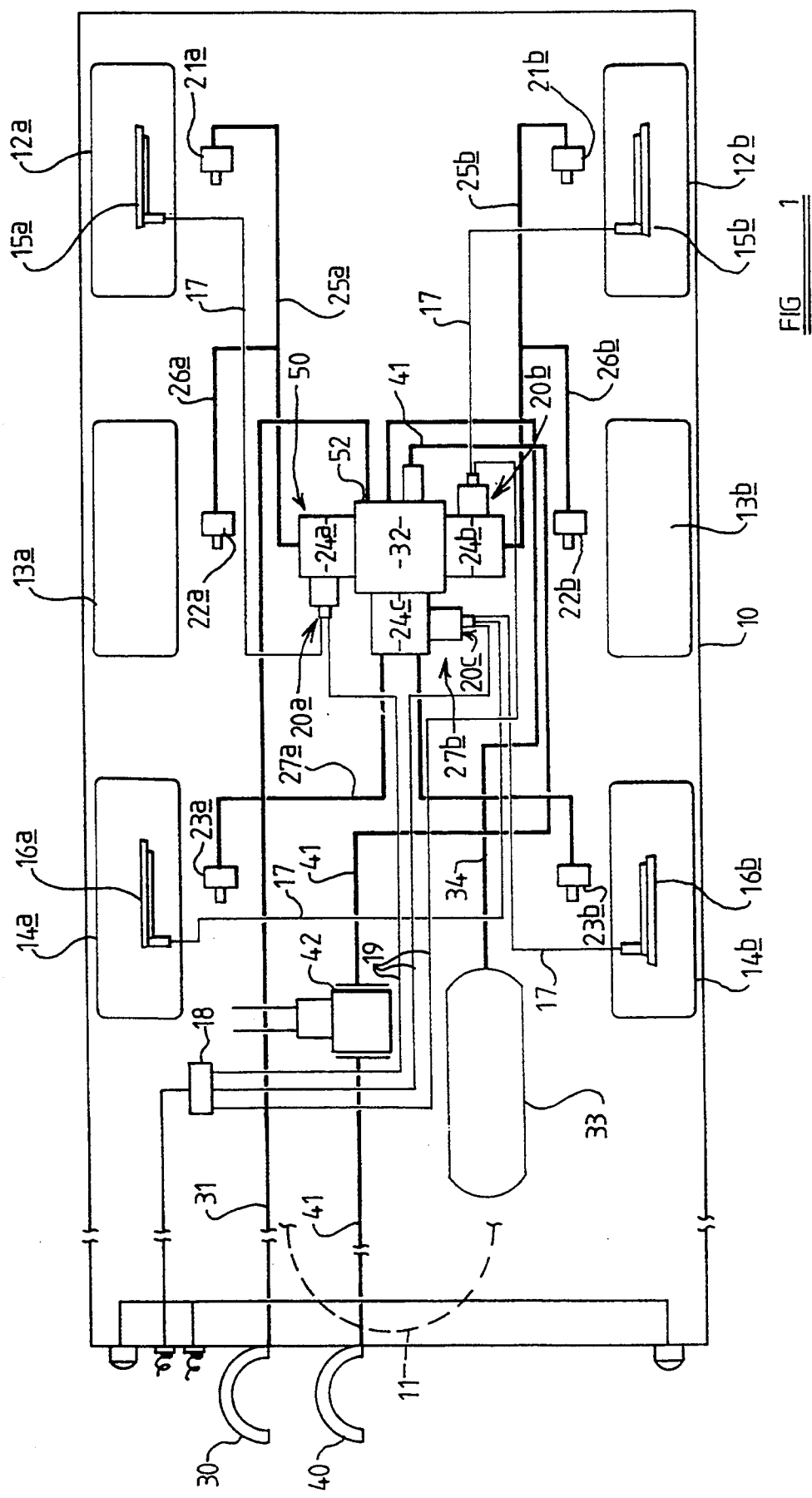
Figure 2:
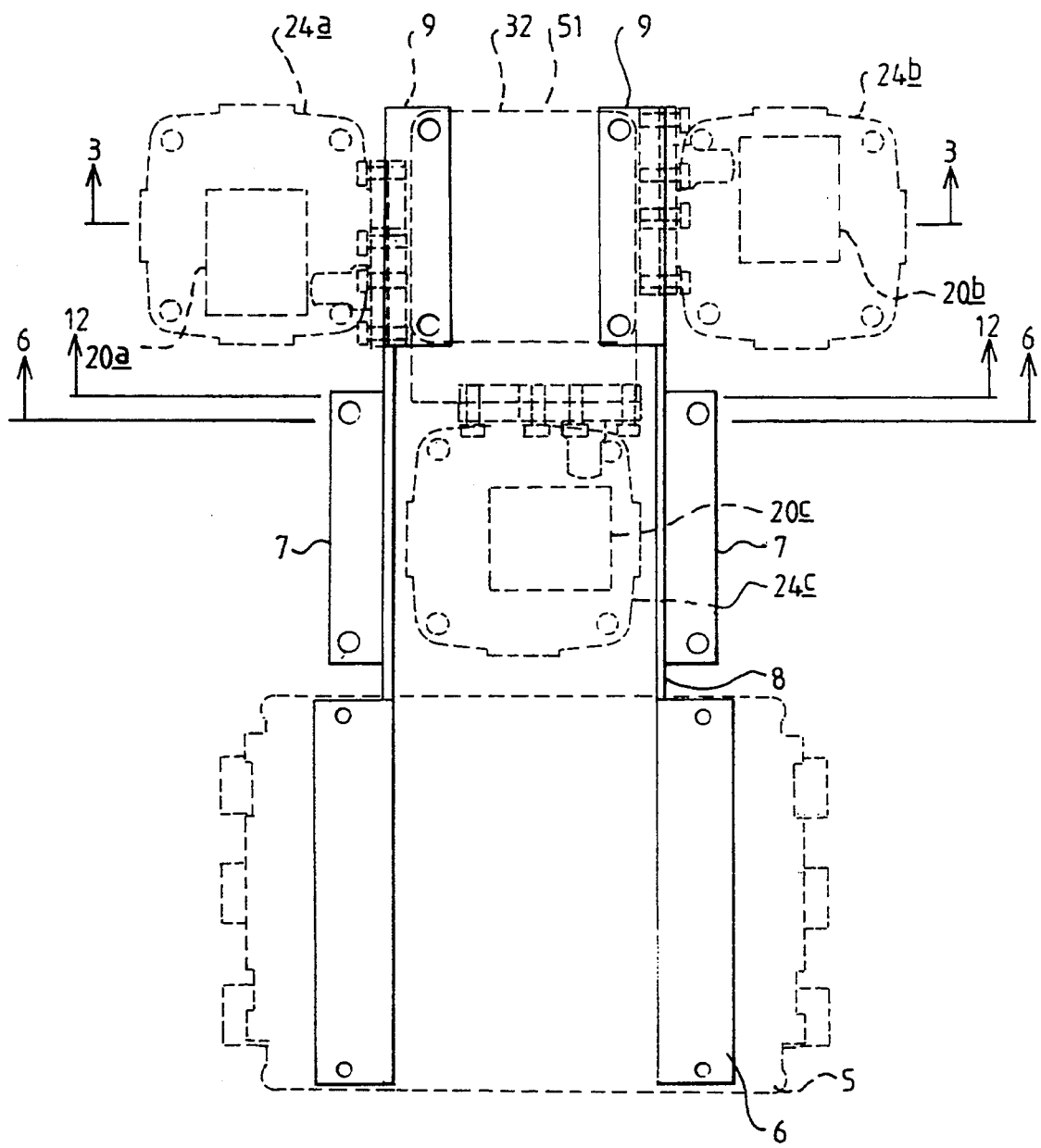
Figure 3:
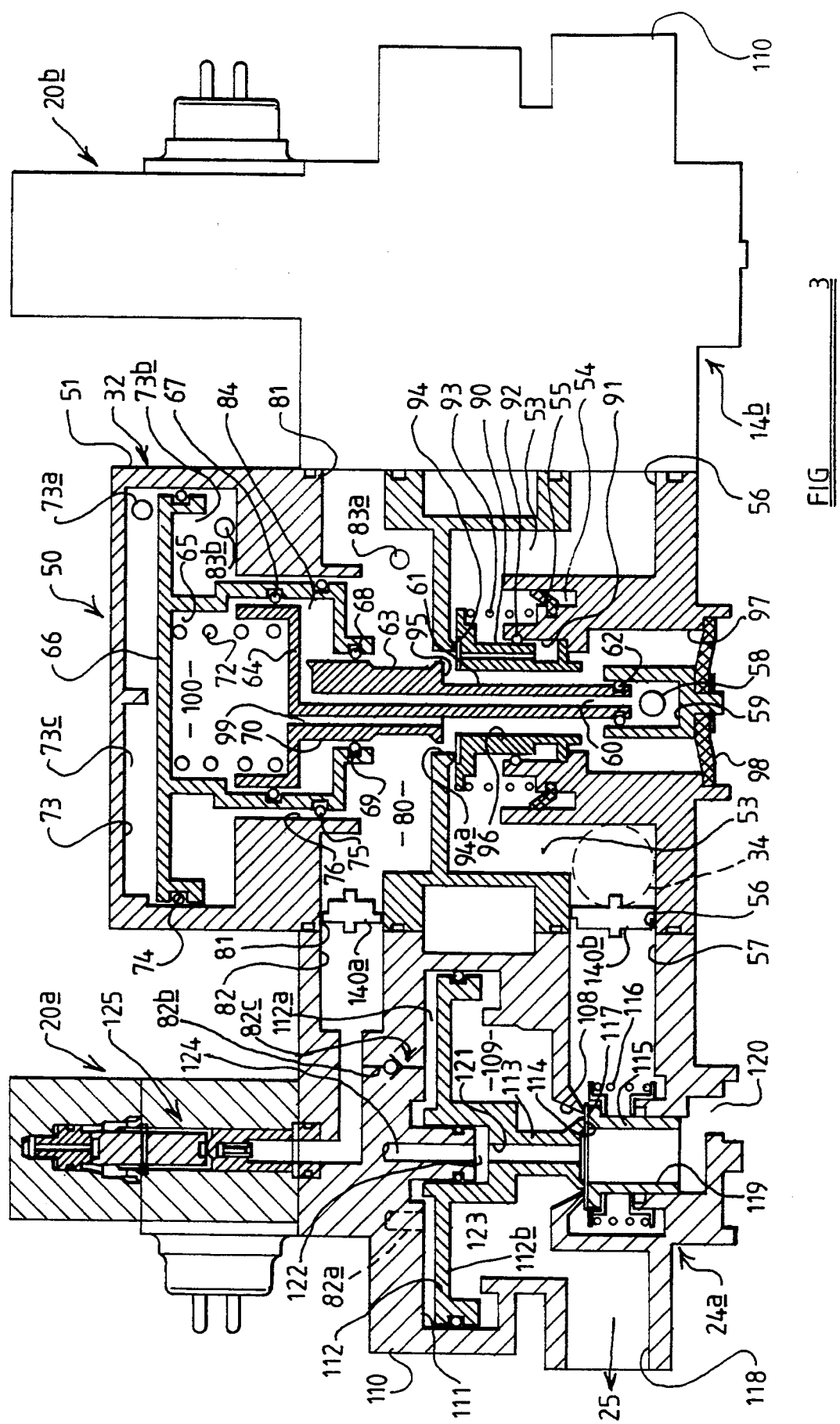
Figure 4:
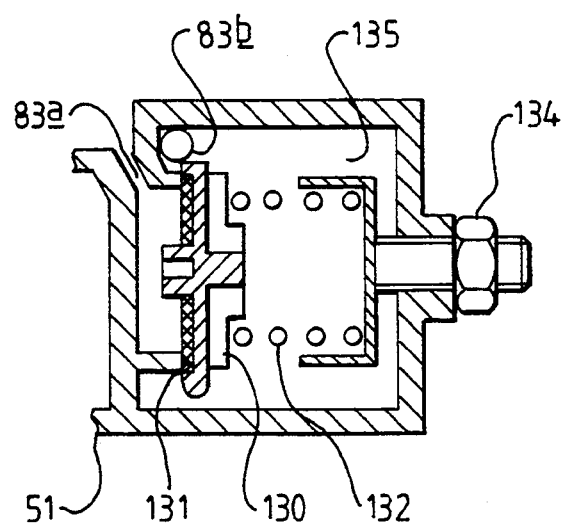
Figure 5:
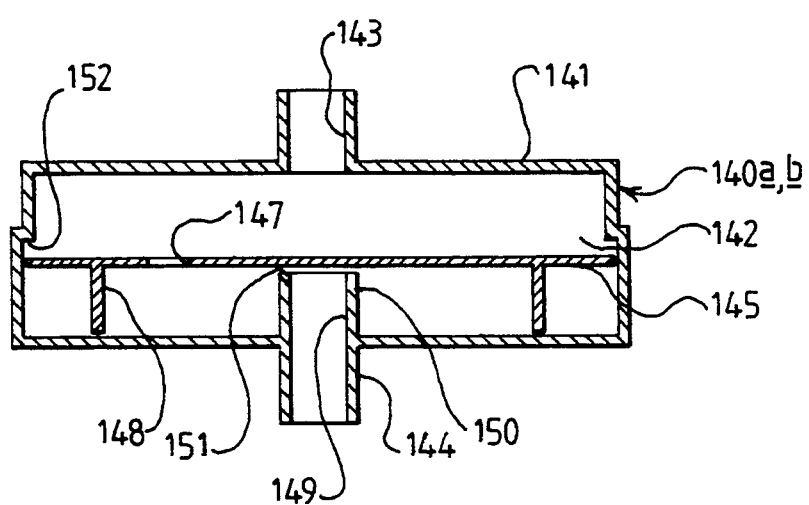
Figure 6:
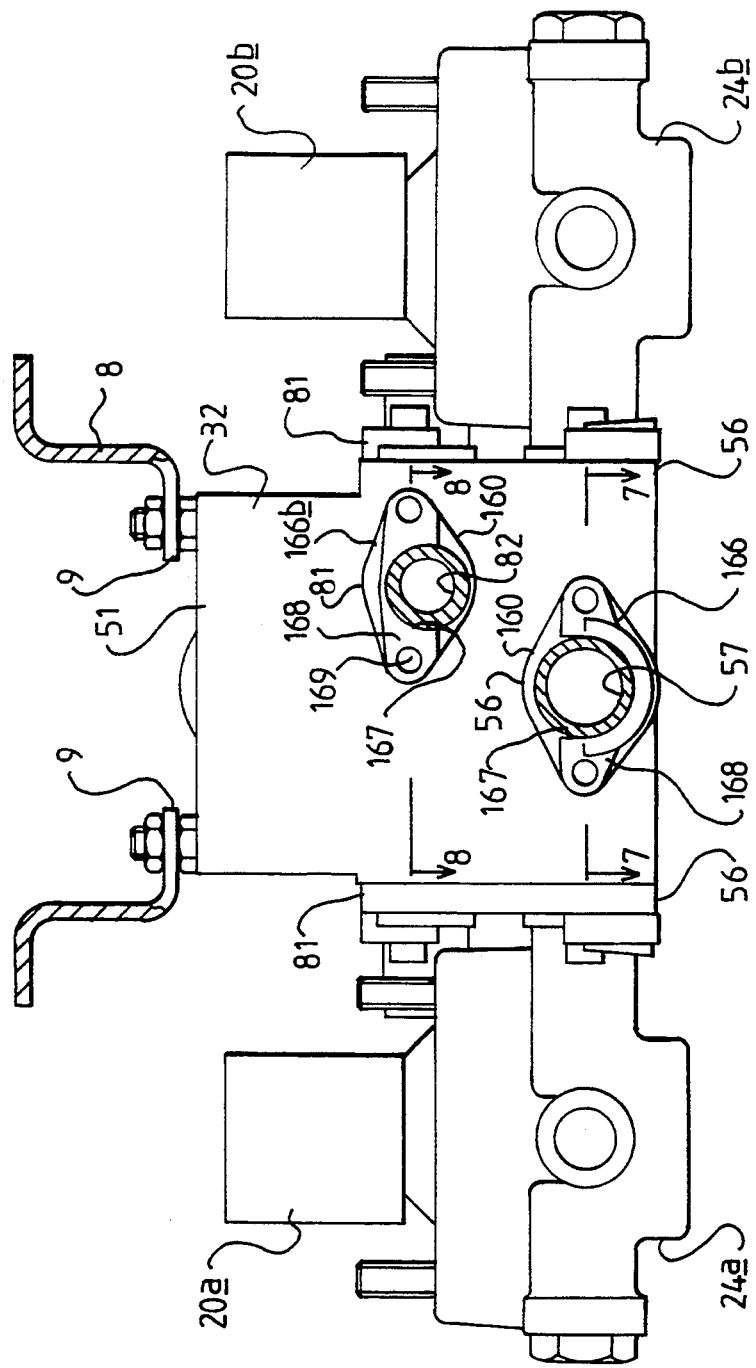
Figure 7:
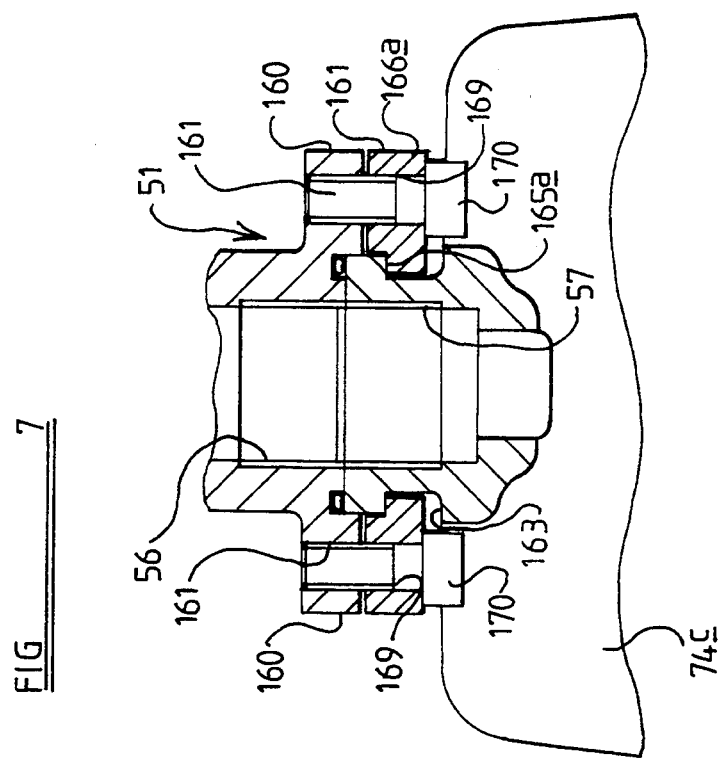
Figure 8:
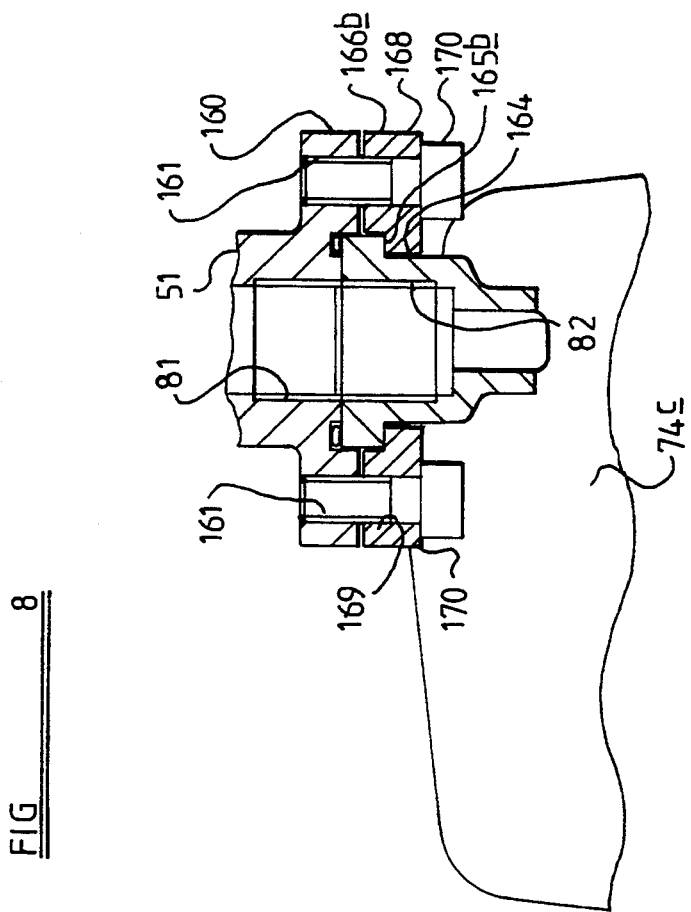
Figure 9:
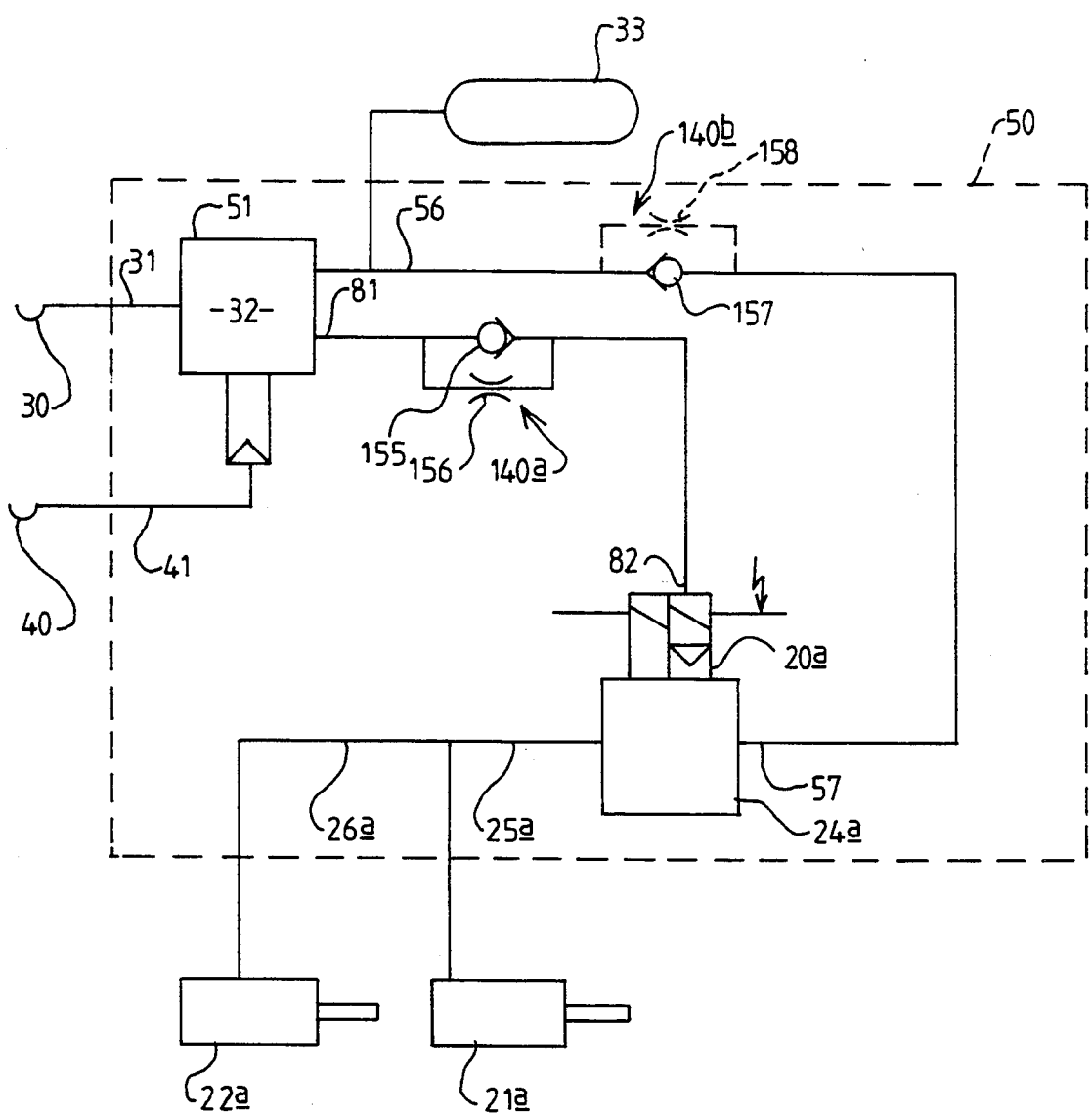
Figure 10:
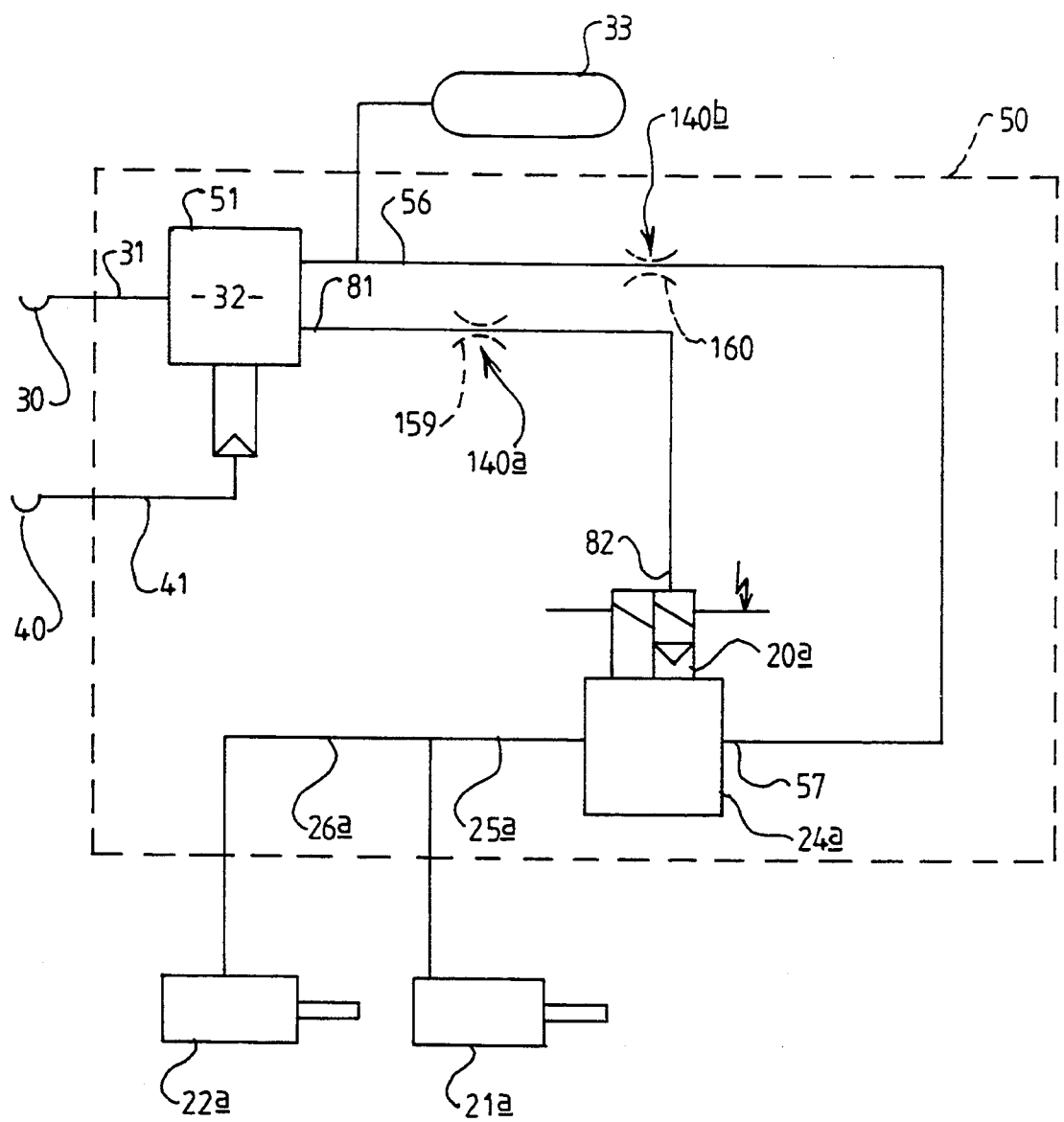
Figure 12:
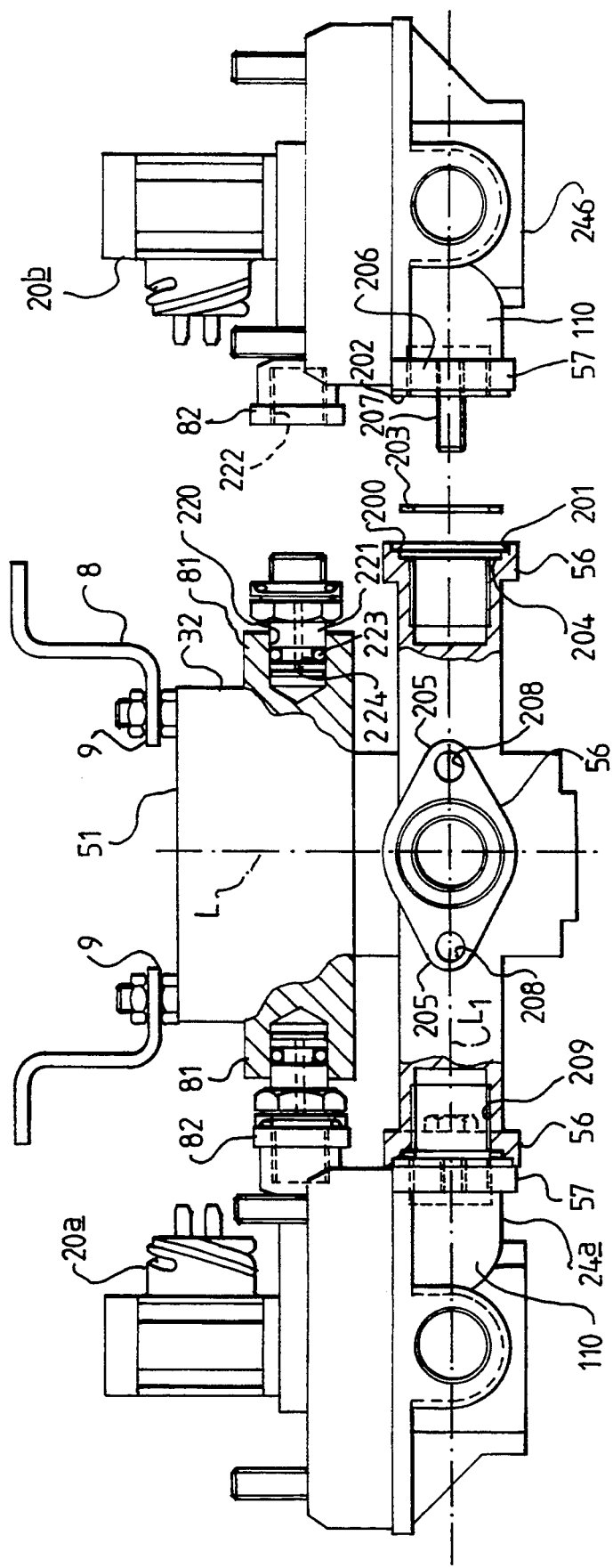
Figure 13:
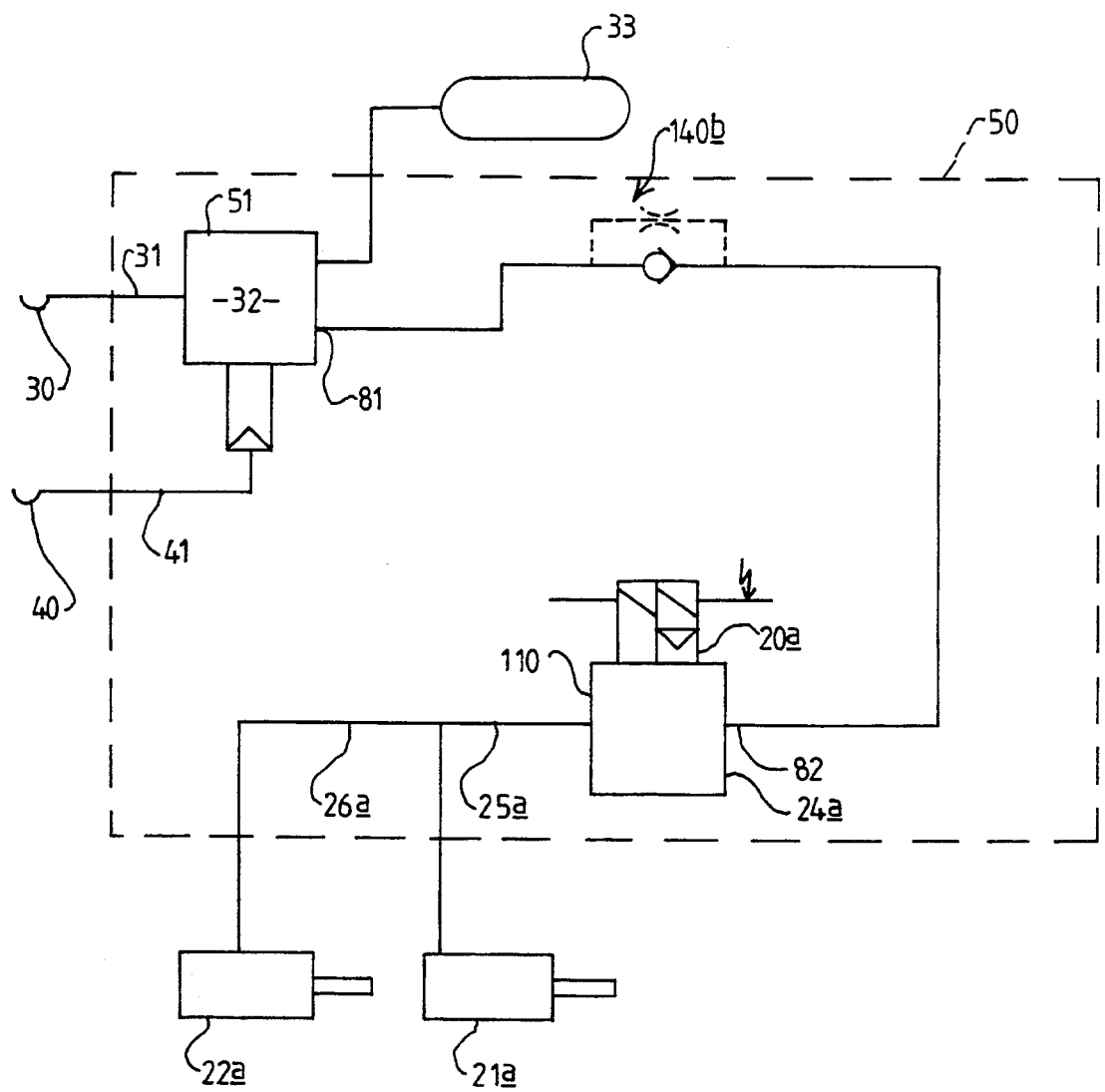
Figure 14:
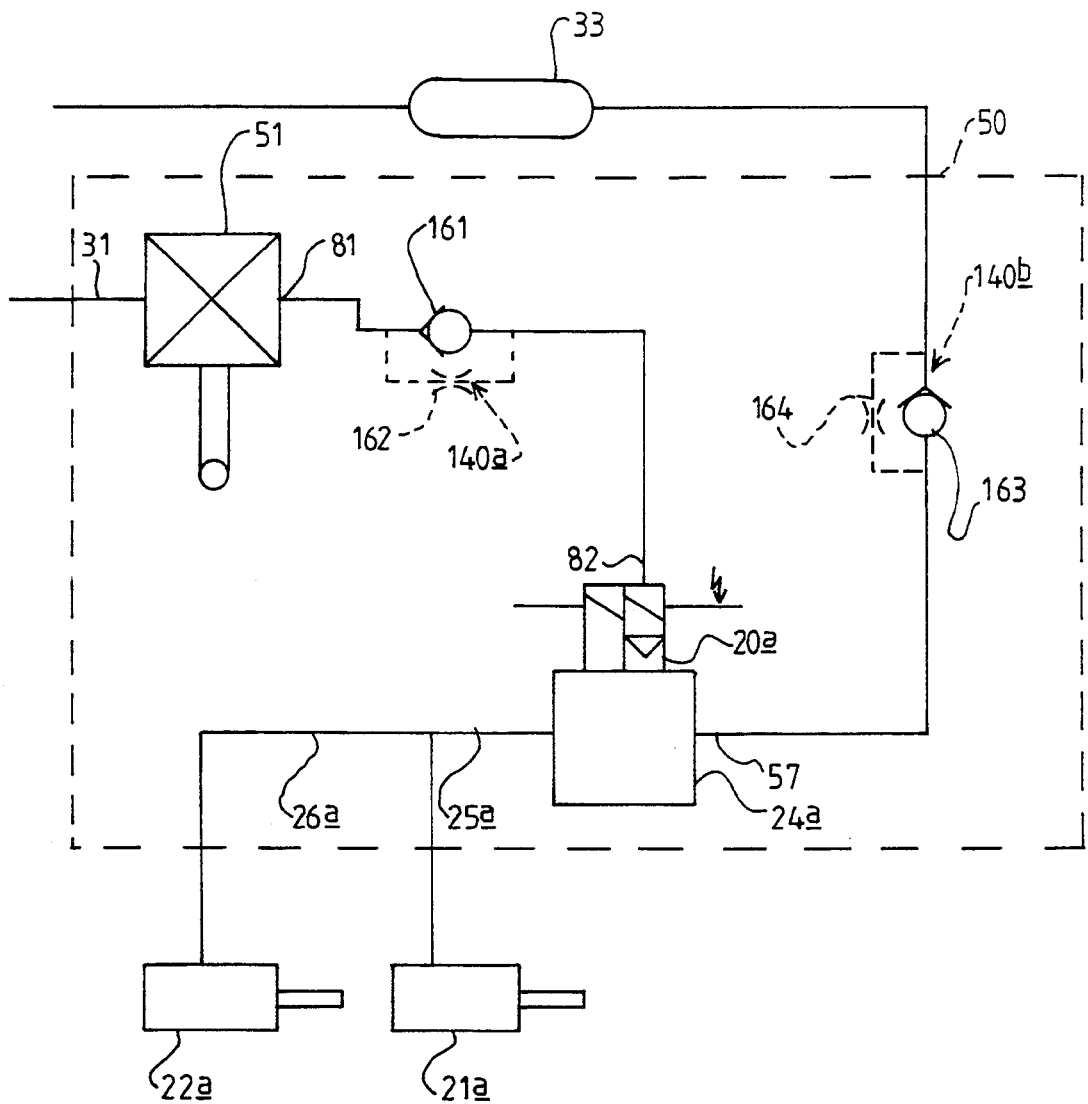
Figure 14A:
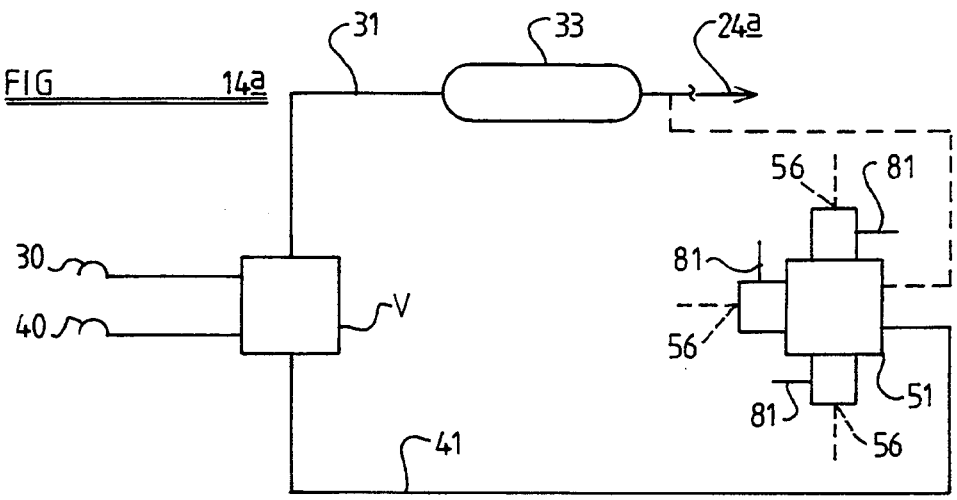
Figure 15:
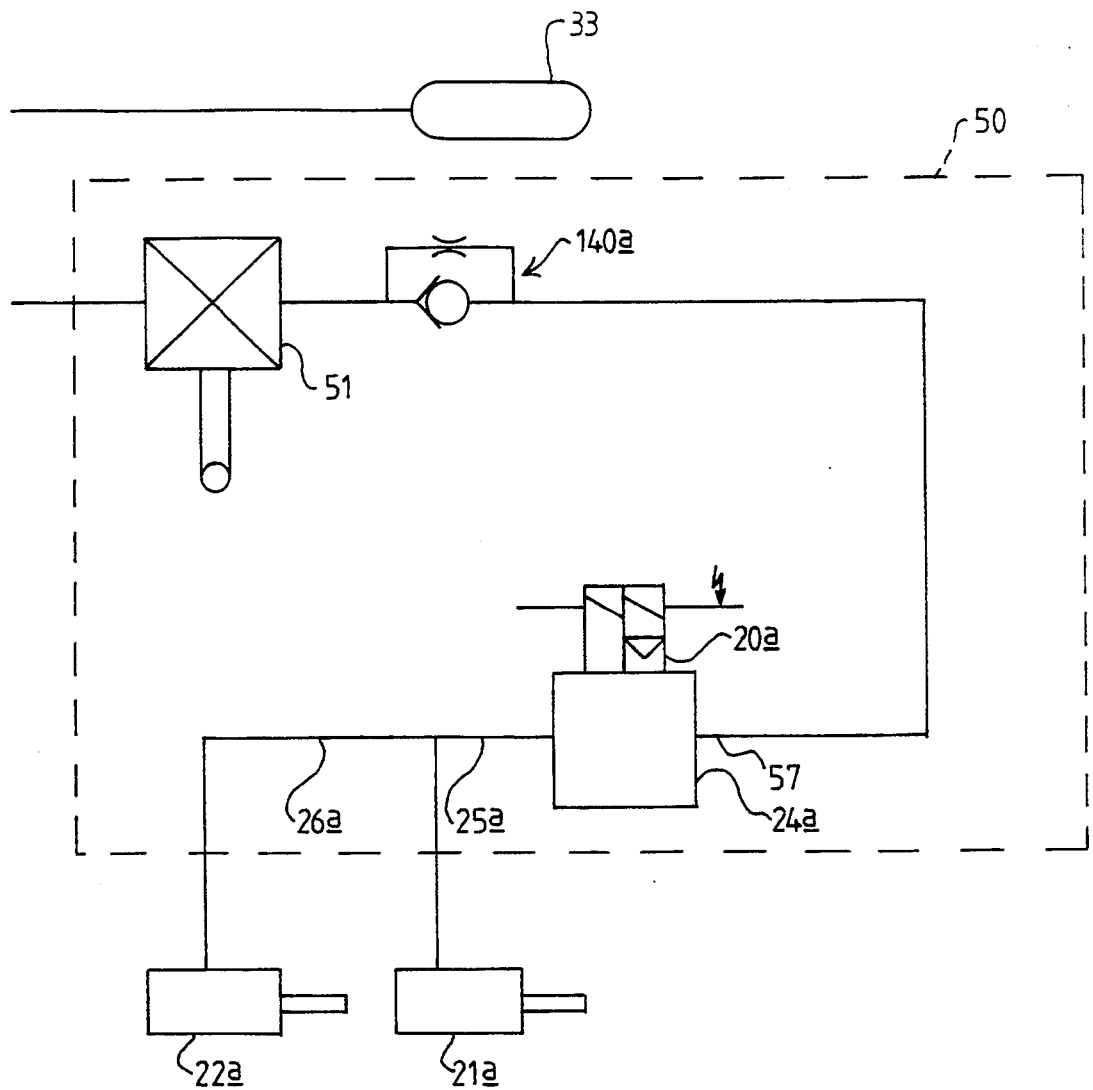
Figure 15A:
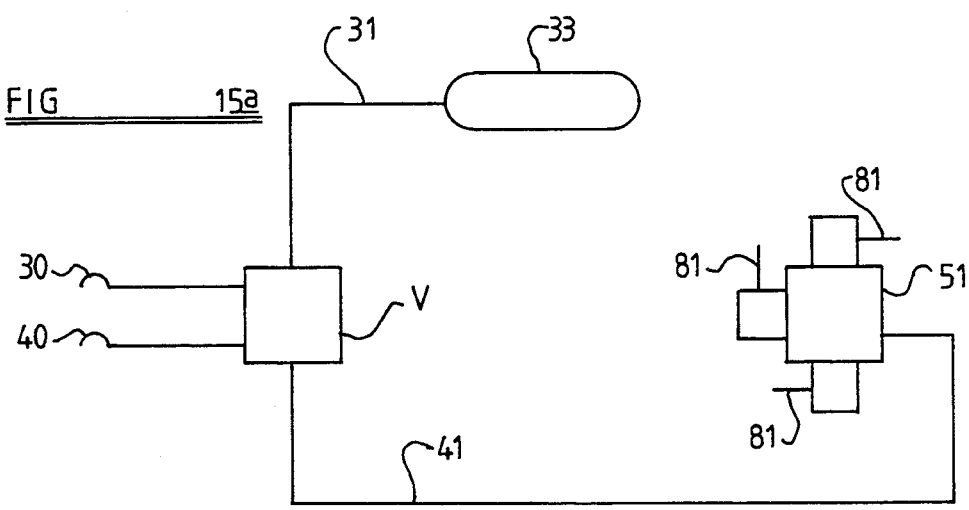

A trailer braking system embodying the invention will now be described by way of example with reference to the accompanying drawings wherein:

FIG. 1 is a diagrammatic illustration of a trailer braking system embodying the invention, FIG. 2 is a diagrammatic plan view showing a unit of the system shown in FIG. 1, FIG. 3 is a diagrammatic developed cross-section taken on the line 3—3 of FIG. 2, FIG. 4 is a fragmentary diagrammatic cross-sectional view similar to that of FIG. 2 but taken on a different section, FIG. 5 is a diagrammatic transverse cross-section through a fluid flow control apparatus of the unit of FIG. 2, FIG. 6 is a section on the line 6—6 of FIG. 2, FIG. 7 is a section on the line 7—7 of FIG. 6, FIG. 8 is a section on the line 8—8 of FIG. 6, FIG. 9 is a schematic illustration of a pneumatic circuit of the unit shown in FIG. 3, FIG. 10 is a schematic illustration showing a modification of the circuit of FIG. 9, and FIG. 11 is a schematic illustration showing another modification of the circuit of FIG. 9, FIG. 12 is a diagrammatic illustration showing a modification of the unit shown in FIG. 2 and FIGS. 6-8, FIG. 13 is a schematic illustration showing another embodiment of the invention, FIGS. 14, 14a are schematic illustrations showing further embodiments of the invention, and FIGS. 15, 15a are schematic illustrations showing still further embodiments of the invention.

Referring to FIG. 1 of the drawings, a semi-trailer is shown at 10 and has a conventional fifth wheel connection 11 and three pairs of wheels 12a, 12b; 13a, 13b; 14a, 14b; disposed towards the rear of the semi-trailer. The trailing and leading pairs of wheels 12a, 12b; 14a, 14b are provided with a wheel speed sensor 15a, 15b and 16a, 16b respectively. The wheel speed sensors 15a–16b are of any desired conventional form and provide signals, which are sent via lines 17 and 19, to a controller 18 of conventional type which is responsive to said signals for sensing skid conditions of the wheels and for generating instructions which are sent via lines 19 to skid control units 20a–20c. In the illustrated example the lines 17 from the wheel speed sensors are taken to the skid control units 20a–20c and are then connected to the lines 19 but if desired the lines 17 could extend directly to the control 18. The lines 19 in this case transmitting only the instructions to the skid control units 20a–20c.

All the wheels 12a–14b are provided with wheel brakes having actuators 21a–23b which are responsive to fluid pressure, hereinafter referred to as brake pressure, supplied thereto. The wheel brakes are conventional air operated brakes which are supplied with brake pressure, comprising operating air under pressure, from a primary fluid pressure supply by fluid pressure supply means comprising supply relay valves 24a–c.

The wheel brake 21a of the right-hand rearmost wheel 12a is connected by a line 25a to a supply relay valve 24a whilst the wheel brake 21b of the left-hand rearmost wheel 12b is connected by a line 25b to a second supply valve 24b. The wheel brake 22a of the middle right-hand wheel 13a is connected to the supply relay valve 24a by a branch line 26a from the line 25a whilst the opposite wheel brake 22b is connected to the supply relay valve 24b by a branch line 26b from the line 25b.

The wheel brake 23a of the right-hand front wheel 14a is connected by a line 27a to a third supply relay valve 24c whilst the wheel brake 23b of the left-hand forward wheel 14b is connected to the supply relay valve 24c by a line 27b.

The primary fluid pressure supply includes a fluid pressure source comprising a conventional "emergency" connection 30 for fluid pressure from the tractor vehicle and a fluid pressure reservoir 33. The fluid pressure is fed from the connection 30 to an emergency relay valve means 32 by a line 31 and the fluid pressure reservoir 33 is connected to the emergency relay valve means 32 by a further line 34.

A brake command signal from the braking system of the tractor vehicle is fed via a conventional "service" connection 40 and a line 41 to a load sensing means 42 and by a continuation of the line 41 to the emergency relay valve means 32. The emergency relay valve means 32 provides a brake operating signal which is fed by a control line to the supply relay valves 24a–c via the skid control units 20a–20c.

As shown in FIG. 2, the emergency relay valve means 32, the supply valves 24a–24c and the skid control units 20a, 20c are all provided as a single discrete unit 50 which is mounted as a single item on the trailer so that the only connections required are the pneumatic and electrical lines to the unit 50 described hereinbefore. The emergency relay valve means 32 is provided in a discrete housing part 51 which is separate from three further discrete housing pans 110 which provide the supply valves 24a–c and the skid control units 20a–20c and these four discrete housing pans are interconnected as hereinafter to be described in more detail to provide said single discrete unit 50.

The emergency relay valve means 32 is bolted to lower flanges 9 of a mounting bracket 8 which is provided with out-turned lower flanges 7 which are bolted to a convenient part of the vehicle. The bracket 8 has upper out-turned flanges 6 to which a junction box 5 or, if desired, the controller 18 is bolted.

Accordingly, when it is desired to provide a trailer, such as a semi-trailer illustrated in FIG. 1, with a vehicle braking system as described hereinbefore, it is simply necessary to fit the unit 50 at a convenient place on the trailer and then to run the various electrical and pneumatic lines to connect the wheel brakes 21a–23b, reservoir 33, connections 30,40, and controller 18 to the unit 50 as well as to connect the controller 18 to the wheel speed sensors 15a–16b. The controller 18 may be mounted on the assembly of housing parts or be mounted on the bracket 8 and may be pre-wired to the skid control units.

Referring now to FIG. 3, which shows in diagrammatic form part of the unit 50 and developed onto the line 3—3 of FIG. 2.

The emergency relay valve means 32 comprises the housing part 51 provided with a first port 52, shown in FIG. 1 but not visible in The section taken on FIG. 3, which communicates with a fluid pressure chamber 53, which comprises a brake pressure supply chamber, via a passage 54 provided with a non-return valve 55. The chamber 53 is also connected by a second port to the line 34 to the fluid pressure reservoir 33 and is provided with three brake pressure outlet ports 56 disposed at 90° to each other, as best shown in FIG. 6, each of which is connected to a brake pressure inlet port of a supply valve of a respective skid control unit/supply valve assembly 20a/24a, 20b/24b, 20c/24c. In FIG. 3 only one such assembly 20a, 24a is shown in section, and the inlet ports thereof are shown at 82 and 57 respectively. A second such assembly 20b, 24b is shown in outline only but the housings 110 of all three assemblies are connected to the housing 51.

A passage 58 extends from the passage 54 on the upstream side of the non-return valve 55 to a chamber 59 which communicates with a central passage 60 of a valve spindle 61 which is sealingly and slidably engaged with the wall of the chamber 59 by means of an O-ring seal 62. The valve spindle 61 projects downwardly from a downwardly depending boss 63 of a valve spindle piston 64. The valve spindle piston 64 is slidably mounted within cylinder 65 carried by a control piston 66. An O-ring seal 67 is provided between the valve spindle piston 64 and the wall of the cylinder 65 whilst a further O-ring seal 68 is provided between a tubular extension 69 of the cylinder 65 and an upper part 70 of the boss 63. The passage 60 of the valve spindle 61 opens to a chamber 84 between the under surface of the piston 64 and the cylinder 65.

A coil compression spring 72 is provided within the cylinder 65 so as normally to bias the valve spindle piston 64 downwardly away from the control piston 66.

The control piston 66 is provided within a control piston cylinder 73 of the housing 32 and an O-ring seal 74 is provided therebetween whilst a further O-ring seal 75 is provided between the external wall of the cylinder 65 and the wall of a passage 76 extending downwardly from the cylinder 73. The brake command signal is supplied to the cylinder 73, from the line 41, through a brake command signal port 73a.

The housing 51 also provides a brake operating signal chamber 80 having three brake operating signal outlet ports 81, only two of which are shown in FIG. 3, disposed at 90° to each other and connected to respective brake operating signal inlet ports 82, only one of which is shown in FIG. 3, of the skid control unit of the control unit/valve means assembly 20a, 24a.

The chamber 80 is connected by a port 83a to a predominance valve hereinafter to be described, whilst the predominance valve is also connected by a port 83b to a chamber 73b on the opposite side of the control piston 66 to a chamber 73c to which the brake command signal is supplied and disposed externally of the cylinder 65.

A valve member 90 is slidably mounted in a passage 91 with an O-ring seal 92 between the valve member 90 and the wall of the passage 91. The valve member 90 is normally resiliently biased by a coil compression spring 93 into sealing engagement with a valve seat 94 surrounding a port 94a between the fluid pressure chamber 53 and the brake operating signal chamber 80. The valve member 90 is also adapted to sealingly engage with a valve seat 95 provided on the boss 63 of the valve spindle piston 64 when that piston is in a lower position. The valve member 90 has an exhaust passage 96 therein which communicates with an exhaust port 97 in the housing 51 which is provided with a non-return valve 98.

The boss 63 is provided with a passage 99 which can provide communication between the atmosphere via passage 96, port 97 and non-return valve 98, and a chamber 100 provided between the control and valve spindle pistons 66, 64.

Each skid control unit/supply valve assembly 20a/24a, 20b/24b, 20c/24c is identical and hence only the assembly 20a/24a shown in FIG. 3 will be hereinafter described.

The assembly 20a/24a comprises the housing 110 having a cylinder 111 therein in which a control piston 112 is slidably mounted. The piston 112 has a downwardly depending boss 113 having a valve seat 114 at its lower end adapted to sealingly engage with a movable valve member 115. The valve member 115 is normally resiliently biased by a coil compression spring 116 upwardly into sealing engagement with a further valve seat 117 provided between the inlet port 57 and an outlet port 118.

An exhaust passage 119 extends axially through the valve member 115 and communicates with an exhaust port 120 in the housing 110. An axial passage 121 extends through the boss 113 of the control piston 112 and communicates with a chamber 122 provided between the lower end of a boss 123 which depends downwardly from the upper wall of the cylinder 111.

A passage 124 connects the chamber 122 to a solenoid operated valve means 125, which is connected to the brake operating signal inlet port 82 described hereinbefore. A chamber 112a above the piston 112 is connected by an input passage 82a to an outlet of the solenoid valve means. The solenoid valve means is operable to connect the passage 82a either to the passage 124 or to the port 82. The chamber 112a is also connected to the inlet port 82 by a by-pass passage 82b provided with a one-way flow control valve 82c. The valve 82c permits flow only in the direction from the chamber 112a to the port 82 so as to permit exhaust flow to by-pass the solenoid valve means to avoid restriction to the exhaust flow.

In use of the vehicle braking system, when the vehicle is at rest with the trailer disconnected from the tractor and the reservoir 33 is not pressurised, the non-return valve 55 is closed, the control valve 66 is at the top of its stroke, as is the valve member 90. The solenoid of the skid control unit 125 is de-energised and the control piston 112 and valve member 115 of the valve unit 24a are in their uppermost position.

Should the reservoir be pressurised with the trailer disconnected from the tractor, the connection to the port 52 is at atmospheric pressure but the pressure in the reservoir 33 is retained by the non-return valve 55.

Since the first port 52 is at atmospheric pressure the passage 58 and chamber 84 are also at atmospheric pressure so that spring 72 pushes the piston 64 down to send the seat 95 against the valve member 90 which member is also pushed down and thus pressure from the chamber 53 and reservoir 33 passes into the chamber 80. This pressure in the chamber 80 provides a brake operating signal to the port 82 of the control unit/supply valve assembly 20a/24a to act on piston 112 to move this piston down to push down valve member 115. As a result, pressure in chamber 53 and hence in the reservoir 33 passes into the chamber 109 and out from port 118 to the vehicle brakes.

When the trailer is connected to the tractor and pressurisation of the system starts then, if the reservoir is not charged, initially fluid pressure flows from the first port 52, not shown, to which it has been supplied by the line 31, into the passage 54 and past the non-return valve 55 into the chamber 53 and thence via line 34 into reservoir 33 and via valve seat 94, which is maintained open by the spring 72 in this condition, into the chamber 80 and then via ports 81, 82 into chamber 112a. This urges piston 112 down to close valve seat 114 and open valve seat 117 so that fluid in chamber 53 is fed to the vehicle brake 21a, 22a via line 25a and brake line 26a.

When the pressure applied by the fluid in the chamber 84 exceeds the force applied by the spring 72 the piston 64 moves up and connects the chamber 80 to exhaust so that the vehicle brakes are thus released. In addition the fluid under pressure passes through passage 58 into chamber 59 and hence via passage 60 into the chamber 84 between the control piston 66 and valve spindle piston 64.

Under normal circumstances, i.e. when the pressure in the reservoir 33 and the chamber 84 equals that in the line 31 and the brake command signal is commanding the brakes to be off, the brake command signal on line 41 communicated to the chamber 73c through the port 73a does not displace the control piston 66 downwardly. Hence, when the pressure on piston 64 overcomes the load of spring 72 the piston 64 and boss 63 move up to permit the valve member 90 to move up and hence the valve member 90, which co-operates with the valve seat 94 to provide an inlet valve, is maintained in sealing engagement with the valve seat 94 by the coil compression spring 93, thus maintaining the inlet valve closed and preventing communication between the chamber 53 and the chamber 80. At the same time, because of the upper position of the control piston 66 and valve spindle piston 64, the valve seat 95, which co-operates with the valve member 90 to provide an exhaust valve, is maintained out of sealing engagement with the valve member 90, thus maintaining the exhaust valve open and placing the chamber 80 in communication with the exhaust passage 96 which communicates with atmosphere through the non-return valve 98. Thus, the pressure in the chamber 80 is at or substantially at atmospheric pressure and hence a valve operating signal supplied therefrom through the ports 82 to the chamber 112a of the control unit supply valve assembly 20a/24a is similarly at atmospheric pressure, thereby permitting the control piston 112 of the valve means 24a to move upwardly under the pressure of fluid in the associated line 25a, so closing an inlet valve provided by the valve seat 108 and opening an exhaust valve provided by the valve seat 114, thereby permitting the brake pressure in the line 25a from the brakes 21a, 22a to exhaust to atmosphere through the exhaust opening 120.

When the brake system of the tractor vehicle is actuated to cause the brakes to be applied, a brake command signal proportional to the extent of brake pedal depression is sent by connection 40 and the line 41 and inlet 73a into the chamber 73c to act on the control piston 66 to move the piston 66 downwardly, together with the valve spindle piston 64. Consequently, the valve seat 95 is moved into engagement with the valve member 90 to close the exhaust valve and hence prevent communication between the chamber 80 and the exhaust passage 96 and also to move the valve member 90 downwardly to move the valve member 90 out of sealing engagement with the valve seat 94 to open the inlet valve and so to permit communication between the chamber 53 and the chamber 80, through the port 94a, and hence to provide a brake operating signal through the ports 81, 82 to the control unit/supply valve assembly 20a, 24a.

The pressure in the chamber 80 acts on the underside of the part of the piston in the chamber 80 and passes through the ports 83a, 83b into the chamber 73b to act upon the control piston 66 from below, which causes the control piston 66 and valve spindle piston 64 to move upwardly so that the valve member 90 moves into engagement with the valve seat 94 to close the inlet valve to interrupt communication between the chambers 53 and 80 whilst the valve member 90 remains in sealing engagement with the valve seat 95, to maintain the exhaust valve closed so that the chamber 80 is maintained out of communication with the outlet passage 96 when the pressure forces acting upon the control piston 66 have equalised. Change in pressure in the chamber 73c applied from the line 41 will therefore result in a corresponding change in pressure at the port 81 and hence a corresponding brake operating signal is provided to the inlet port 82 of the control unit/supply valve assembly 20a, 24a.

When a brake operating signal is applied through the port 82 a pressure is generated in the chamber 112a thus causing the piston 112 to be displaced downwardly and to move the valve seat 114 into sealing engagement with the valve member 115 to close the exhaust valve and to move the valve member 115 downwardly so as to move it out of engagement with the valve seat 117 to open the inlet valve, thereby permitting communication between the port 57 and port 118 so that the fluid pressure acts on the under surface 112b of the piston 112 and passes along line 25a to provide the brake pressure to the associated wheel brake 21a, 22a. When the forces on each side of the piston 112 balance both the inlet valve and the exhaust valve are closed, so that the pressure in the brakes 21a, 22a is maintained. Reduction of the pressure in the chamber 112a causes an imbalance between the forces acting on the opposite side of the piston 112 and so the piston 112 moves up to open the exhaust valve. Brake pressure from the brakes now flows via chamber 109 through the exhaust valve provided by seat 114 and exhaust tube 119 to exhaust port 120. This process will continue until either the forces acting on the piston 112 balance and a new lower pressure is maintained in the brakes or the air is totally exhausted.

When the brakes are applied fully the piston 66 is moved downwards to such an extent that the valve seat 95 remains in engagement with the valve member 90 whilst the valve member 90 is moved fully out of engagement with the valve seat 94 so that the full fluid pressure in the chamber 53 is communicated to the chamber 80.

If a failure occurs in the air supply line 31, for example, by uncoupling of the coupling 30 or disconnecting the supply line, the pressure falls in the passage 58 and hence in the chamber 84 between the control piston 66 and valve spindle piston 64. As a result the spring 72 will move the valve spindle piston 64 downwardly to move the valve seat 95 into engagement with the valve member 90 and to move the valve member 90 downwardly out of engagement with the valve seat 94 so that the full fluid pressure in the chamber 53 is communicated to the chamber 80 thus providing a brake operating signal to fully apply the vehicle brakes.

The control piston 66 and associated inlet valve 90, 94 and exhaust valve 90, 95 comprise a first signal generating means which generates the brake operating signal as a function of the brake control signal as hereinbefore described.

The valve spindle piston 64, and associated inlet valve 90, 94 and exhaust valve 90, 95 comprise a second signal supply means which generates the brake operating signal as a function of the fluid pressure in said fluid pressure source 30 falling below a predetermined pressure as hereinbefore described.

All the above described functions are overridden by the anti-skid control units 20a–20c which are effective, in conventional manner, to modify the brake operating signal applied to the control piston 112 under the instructions of the controller in generally known fashion by connecting the chamber 112a either to the port 82 or to exhaust.

Referring now to FIG. 4, there is shown another section through the housing 51 to illustrate a predominance device comprising a valve member 130 biased into sealing engagement with a valve seat 131 by a coil compression spring 132, the bias of which can be adjusted by a manual adjustment means 134. The valve member 130 is provided within a chamber 135 and the chamber 135 is connected to port 83b and to port 83a so that when the valve member 130 is in sealing engagement with the seat 131 communication between the ports 83a and 83b is prevented whilst when the valve member 130 is displaced from the valve seat 131 the ports 83a and 83b are placed in communication, thereby permitting the fluid pressure of the brake operating signal in the chamber 80 to be communicated via the port 83b to the chamber 73b to act on the underside of the control piston 66 around the cylinder 65, Depending upon the spring force applied by the spring 122 the fluid pressure in the chamber 80 is applied to the chamber 73b after an increased pressure in the chamber 80 has been reached, sufficient to move the valve member 130 away from the valve seat 131. Only now can piston 66 be moved fully upwardly when the brake command signal releases the brake so as to enable the valve member 90 to move into sealing engagement with the valve seat 94 whilst the valve seat 95 is moved away from the valve member 94.

The provision of the predominance device 130 enables the braking system to be set in such a way that the brake operating signal in the chamber 80 is increased with respect to the brake command signal fed to the chamber 73c in the partial braking range.

In the present example the load sensing valve 42 is of conventional form, so as to limit the maximum brake operating fluid pressure according to the load on the trailer axle/bogie. This is achieved by modulating the brake command signal in the line 41 in accordance with the position of an input lever, for a mechanical suspension or an air bellows pressure in the case of a pneumatic suspension. In the fully laden condition the air pressure ratio across the load sensing valve 42 is generally 1:1, but for a fully unloaded condition the ratio may be for example 3:1, i.e. the command signal supplied to the valve 42 is 3 times the command signal supplied to the port 73a. Preferably means are provided to enable the load sensing valve 42 to be mounted on the housing 51 so as to be part of the single discrete unit 50 Alternatively, if desired, the load sensing valve 41 may be omitted entirely since in certain applications a load sensing facility is not required.

In order to suppress unwanted fluctuations in pressure, caused by operation of one of said means, in relation to any other of the means, fluid flow control structure is preferably provided to prevent such "cross-talk".

In the above described example such fluid flow control structure effect a damping of the fluid flow and comprise a first and second fluid flow control apparatus. The first fluid flow control apparatus is provided in the flow path of the brake operating signal between the first and second signal generating means and each of the skid control units. One such apparatus is illustrated at 140 in FIG. 3 and is shown positioned in the outlet port 81. The second fluid flow control apparatus is provided in the flow path for fluid between the emergency relay valve 32 and each of the supply valve means and one such apparatus is shown at 140b in FIG. 3 and is shown positioned in the outlet passage 56. If desired, however, the fluid flow apparatus may be provided at other locations in the fluid flow path than the outlet passages 81 and 56 described hereinbefore. For example, they could be provided in the associated inlet ports 82 and 57.

Referring now to FIG. 5, each fluid flow apparatus 140a, 140b comprises an enclosure 141 which defines a chamber 142 provided with an inlet port 143 and an outlet port 144. Provided within the chamber 142 is a valve member 145 in the form of a circular disc having a circular opening 147 therein offset from the centre. The valve member 145 has a cylindrical extension 148 which acts as a stop means to limit movement of the valve member towards the end of the chamber 142 having the exit port 144 therein. If desired other stop means may be provided.

Connected to the exit port 144 is an exit passage 149 defined by a tubular member 150 having an annular end surface which provides an annular valve seat 151. A shoulder 152 is provided in the wall of the chamber 142 to limit movement of the valve member 145 in the direction away from the exit port 144.

In use, when fluid under pressure enters the inlet port 143 at low flow rates the fluid can pass through the opening 147 and through the gap provided between the valve seat 151 and the valve member 145 without displacing the valve member 145 away from the shoulder 152, thus at lower flow rates the apparatus does not serve to restrict fluid flow. When the fluid flow rate demanded is greater than a limited amount which is determined by the cross-sectional area of the opening 147 a resultant force acts on the valve member 145 and displaces it towards the end of the chamber 142 having the exit port 144 until such movement is arrested by engagement of the stop member 148 with the end wall of the chamber 142. There is then a relatively small gap provided by co-operation between the disc 145 and the valve seat 151 so that there is a restriction to fluid flow in the direction from the inlet port 143 to the exit port 144.

On reverse flow in the opposite direction the force acting upon the valve member 145 displaces it away from the valve seat 151 so that no restriction is thus provided to fluid flow which can then pass in the reverse direction from the exit port 144 to the inlet port 143 without restriction by said co-operation between the valve member 145 and the valve seat 151 through the opening 147 which does not serve to restrict fluid flow.

In the embodiment illustrated in FIG. 3 the apparatus 140a in the outlet port 81 is disposed so that the exit port 144 is facing the skid control unit 20a so that flow of fluid from the skid control unit 20a to the brake operating signal chamber 80 is unrestricted whilst flow in the reverse direction is restricted.

The apparatus 140b provided in the outlet 56 is disposed so that its exit port 144 is in communication with the chamber 53 so that flow of fluid to the supply valve 24a is unrestricted whilst flow in the reverse direction is restricted.

If desired, the fluid flow may be controlled in different directions to those described above, the fluid flow regime depending upon the cross talk that is encountered in practice and which it is required to control.

Other forms of fluid flow control apparatus to that described above with reference to FIG. 5 may be provided if desired. As illustrated, for example, in FIGS. 9 to 11 any desired form of fluid flow restrictor which is effective to restrict flow in either direction or bi-directionally through outlet ports 81, 56 and the inlet ports 82, 57 may be provided and, if desired, a one-way valve such as a check valve may be connected in parallel therewith. FIG. 9 is a schematic illustration of a pneumatic circuit described hereinbefore with particular reference to FIG. 3 and the same reference numerals have been used to refer to corresponding parts as were used in the preceding Figures.

In FIG. 9 the apparatus 140a provided at an appropriate position along the fluid path provided by the outlet port 81 and the inlet port 82 is illustrated schematically as comprising a one-way valve 155 which prevents flow of fluid from the brake operating signal chamber 80 in the housing 51 to the skid control unit 20a but permits flow in the reverse direction. A fluid flow restrictor 156 is provided which bi-passes the one-way valve 155 so that fluid flow from the skid control unit 20a to the brake operating signal chamber 80 is permitted but restricted. Similarly, the apparatus 140b provided in the fluid path provided by the outlet port 56 and inlet port 57 is shown as comprising a one-way valve 157 which prevents flow of fluid from the skid control unit 20a to the brake pressure chamber 53 in the housing 51 whilst flow in the reverse direction is unrestricted. A fluid flow restrictor 158 is provided to bi-pass the valve 157 so that fluid flow from the unit 20a to the housing 51 is permitted but restricted.

If desired, the fluid flow restrictor 158 may be omitted.

Also, if desired, the apparatus 140a or the apparatus 140b may be omitted.

The above described fluid flow control apparatus ensures that when after anti-lock braking has occurred, pressure in the port 82 is low, there is a sudden inrush of fluid into the assemblies 20a-c/24a-c depression of pressure in the chamber 80 which could affect the control piston 66 is reduced.

When a bi-directional restrictor is provided, without any bypass, in the port 82 then, in addition, if the control piston 66 moves under the influence of pressure supplied to the chamber 73c any resultant fluctuation in pressure in the chamber 80 is not communicated to the skid control/supply valve units 20a–c/24a–c.

The fluid flow control apparatus provided between the ports 57 and 56 ensures that analogous pressure variations do not take place between the components inter-connected by these ports.

Referring now to FIG. 10, there is shown a modification of the circuit shown in FIG. 9 in which both the apparatus 140a and the apparatus 140b each comprise only a bi-directional fluid flow restrictor as shown at 159, 160 respectively. In this version the fluid flow along the respective flow path is restricted in both directions.

If desired, either the apparatus 140a or the apparatus 140b may be omitted.

Referring now to FIG. 11, a further modification of the circuit of FIG. 9 is illustrated. In this modification the apparatus 140a comprises a one-way valve 161 which prevents flow of fluid from the skid control unit 20a to the brake operating signal chamber 80 in the housing 51 whilst flow in the reverse direction is unrestricted. A fluid flow restrictor 162 is provided to bi-pass pass the valve 161 to permit of restricted fluid flow from the control unit 20a to the brake operating signal chamber 80.

Similarly, the apparatus 140b comprises a one-way valve 163 which prevents flow of fluid from the supply valve 24a to the brake pressure supply chamber 53 in the housing 51 whilst flow in the reverse direction is unrestricted. If desired, a fluid flow restrictor 164 may be provided to bi-pass the valve 163 to permit of restricted flow of fluid from the supply valve 24a towards the housing 51.

If desired, the apparatus 140a or the apparatus 140b may be omitted.

The check valves may be arranged to operate in one operative flow direction depending upon the desired fluid flow control regime.

The above described fluid flow control structure may be provided in other ways, for example by providing passages or chambers of appropriate length or volume in the fluid flow path without separately inserted apparatus.

Although in the above example the housing 51 has been described as having three sets of ports 56, 81, for connection to associated control unit/supply valve housings 110, if desired the chambers 80 and 53 may be provided with two ports or more than three ports, depending upon the number of skid control unit/supply valve assemblies it is desired be capable of connection to the housing 51. If desired, the housing 51 may be provided with a given number of ports and some of these ports may be connected to skid control unit/supply valve assemblies, the other ports being blanked off where they are redundant having regard to the number of skid control unit/supply valve assemblies required in any particular application.

In the example illustrated with reference to FIG. 2, the housing part 51 is connected to a portion of each housing part 110 which provides the supply valves 24a–c by a connecting means hereinafter to be described, whilst the portion of each housing part 110 which provides the skid control units 20a–c is connected to the portion of each housing which provide the supply valves 24a–c.

Referring now to FIGS. 6–8 the outlet ports 81 and 56 are spaced transversely and are of the configuration shown in FIGS. 6–8 and are provided with a connecting flange 160 having diametrically opposite threaded apertures 161.

The inlet ports 82 and 57 are of the configuration shown in FIGS. 6–8. The port 57 has a substantially semi-circumferentially extending groove 163 formed therein, whilst the port 82 has a substantially semi-circumferentially extending shoulder 164 provided in its outer surface. The groove 163 and the shoulder 164 provide an abutment surface 165a, 165b respectively which is engaged by yokes 166a, 166b. The yokes 166a, 166b have a generally U-shaped recess 167 therein and a mounting flange 168 which is provided with apertures 169. Bolts 170 pass through the apertures 169 and are threadedly engaged with the threaded apertures 161 of the mounting flange 160.

As best shown in FIG. 6 the yokes 166a, 166b are disposed on the side of their respective pair of ports which is remote from the yoke 166b, 166a respectively on the other pair of ports. Thus, when the bolts 170 are tightened they clamp the ports 56, 57 and 81, 82 together and although each yoke engages only over approximately half of the circumference of its associated port pair because the yokes are disposed on opposite sides of their port pairs, they co-operate to connect the ports together and, at the same time, to connect the housings 110 to the housing 51.

Referring now to FIG. 12 an alternative and preferred means for mounting the plurality of second housing parts 110 on the first housing part 51 is shown.

FIG. 12 is a view, partly exploded, of a further embodiment, taken on a line corresponding to the line 12—12 of FIG. 2, but with parts shown in section and parts omitted. The same reference numerals have been used to refer to corresponding parts as have been used in the preceding Figures.

As in the embodiment described with reference to FIGS. 6–8 the second housing parts 110 are releasably connected to the first housing part 51 by mounting surfaces of the first housing part, provided by the ports 56, co-operating with a mounting surface of each second housing part, provided by the ports 57 and the interconnected brake pressure ports 56, 57 provide a first pair of ports which are transversely spaced, i.e. in the direction of the line L, from the associated interconnected brake operating signal ports 81, 82 which provide a second pair of ports.

If desired, such co-operating mounting surfaces could be provided in other ways and could be provided by the ports 81 and 82 instead of or as well as the ports 56, 57.

The brake pressure outlet port 56 has a transversely extending surface 200, surrounded by a cylindrical flange 201, which is opposed to a transversely extending surface 202 of the brake pressure inlet port 57. The diameter of the surface 202 is less than that of the internal surface of the flange 201 and thus the surfaces 200 and 202 can be juxtaposed in different transverse positions within the limits imposed by the above mentioned difference in diameter. A rectangular in cross-section sealing ring 203 is interposed between the surfaces 200, 202 and is partly received in a rebate 204 in the surface 200. The ports 56, 57 are provided with ears 205, 206 respectively. A screw threaded pin 207 is threadedly engaged in each ear 206 so as to extend therefrom and is received in a clearance opening 208 provided in each ear 205. A nut 209 is engaged with each pin and provide abutment members to engage the ears 205 and so clamp the ports 56, 57 together. The clearance opening 208 permits the port to be clamped together with the surfaces in the above mentioned different transverse juxtaposition to accommodate any external mis-alignment due to manufacturing tolerances. If desired bolts may be used instead of pins 207, the shanks of the bolts extending through the clearance openings, and being threadedly received in the ears 206 whilst the heads of the bolts provide the abutment members. Alternatively, any other suitable clamping means may be provided.

The brake operating signal outlet 81 is provided with a generally cylindrical socket 220 whilst the interconnected inlet port 82 is provided with a spigot 221. The spigot 221 is provided as a separate element having a screw threaded boss received in a screw threaded part 222 of the port 82. A sealing ring 223 is provided, partly received in a groove 224, in the spigot 221. The spigot can thus be sealingly received within the socket with tolerance longitudinally of the socket and thus can accommodate variation in juxtaposition in a direction normal to said transverse direction, i.e. in the direction of the line L, due to manufacturing tolerances.

By arranging that the housings 110 are simply and easily attachable to and detachable from the housing 51 maintenance of the unit is facilitated since if, for example, a component in a skid control unit or a supply valve fails the whole assembly can be removed and a replacement substituted.

Although in the above example the housing 51 has been described as a housing separate from the housing 110 which provides each skid control unit/supply valve but with the respective housings connected directly together, if desired they may be connected together indirectly by means of appropriate pipes so long as the connected together assembly is mountable as a single unit on the vehicle.

Furthermore, if desired each skid control unit may be provided in a housing which is provided separately to each housing of a valve means with suitable connection being provided therebetween, for example, by means of an appropriate pipe or pipes. Furthermore, the part of the housing 51 incorporating the piston 66 and the chamber 80 may be formed in a housing part which is separate from a housing part containing the chamber 53 and valve member 90 but with appropriate connection therebetween to receive the valve spindle 61 and fluid pathways.

In all cases all such separately provided housing parts are connected together either by means of the inter-connecting pipes or by means of appropriate bracket means or the like, so that the housings may be connected together so as to be mountable on the vehicle as a discrete unit.

Alternatively, the components provided by and within the housing 51 and by and within the housing 110, which in the illustrated example is connected directly to the housing 51, may be provided by and within a single housing of one piece or of any desired multipart construction.

Although in the above described example the controller 18 is shown as a separate unit mounted on the vehicle at a location remote from the unit 50, if desired the controller 18 may be provided as a part of the single discrete unit 50. In this case the lines 19 would be connected to the control units 20a–20b, prior to mounting of the unit 50 on a vehicle, preferably during manufacture.

In the embodiments described hereinbefore the supply valves have been of the relay type but in further modifications they may comprise in-line type valves. Except as hereinafter to be described these further modifications are the same as those previously described.

Referring now to FIG. 13 there is shown a schematic illustration of a pneumatic circuit analogous to that of FIG. 9 and like FIG. 9 it is to be understood that the housing 51 is provided with a similar plurality, of brake operating signal outlet ports 81 connected to respective supply valves 24a although only one such assembly is shown in FIG. 13.

In FIG. 13 the supply valve 24a is an in-line valve and the brake operating signal is supplied to a brake operating signal inlet port 82 of the in-line valve 24a. The skid control unit 20a comprises a solenoid valve which directly modulates the brake operating signal fluid to either let it pass to the brakes 21a, 22a or exhaust it to atmosphere in conventional manner on anti-skid operation. The same options for flow restriction or otherwise as are described for flow through the ports 81, 82 in the case of FIG. 9, are available as indicated generally at 140a and adapted for the appropriate flow rate.

In these further embodiments a single pair of interconnected ports are provided and the various second housing parts 110 are mounted on the first housing part 51 thereby. For example by using a clamping arrangement as described for the ports 56, 57 in connection with FIG. 12.

Although in the embodiments described hereinbefore the first housing part has been described as containing first and second signal generating means if desired it may contain only a first signal generating means and the first signal generating means may comprise a load sensing valve of conventional function similar to that of the valve described at 42 in FIG. 1. Such an embodiment is illustrated schematically in FIG. 14 where the same reference numerals are used for corresponding parts as in FIG. 9 and again it is to be understood that the housing 51 is provided with a plurality of brake operating signal outlet ports 81 connected to respective skid control unit/supply relay valve combinations.

FIG. 15 shows another embodiment similar to that of FIG. 14 but using in-line supply valves.

In FIG. 14 the same options for flow restriction or otherwise as are described for flow through the ports 81, 82 in the case of FIG. 9 are available as indicated generally at 140a whilst at 140b are provided the same options for flow restriction or otherwise analogously as are described for flow through the ports 56, 57 in the case of FIG. 9.

In FIG. 15 the same options for flow restriction or otherwise as are described for flow through the ports 81, 82 in the case of FIG. 9 are available as indicated generally at 140a and adapted for the appropriate flow rate.

Upstream of the load sensor valve 51 in both FIG. 14 and FIG. 15 connections to a tractor vehicle are provided, as shown at FIG. 14a and 15b respectively. This connection may be via a relay emergency valve V which has the same function as the valve illustrated in FIG. 3 so that if the "emergency" connection 30 fails the brakes will be automatically applied using air from the reservoir 33. If desired, the supply may be via other types of valve when a relay emergency valve is not required.

Further alternatively the first housing part may contain a load sensing valve as well as a second signal generating means to provide an emergency relay valve function.

If desired, in FIGS. 14 and 14a the load sensing valve may be provided with a brake pressure chamber having an inlet for brake pressure supplied, as shown by the dotted line in FIG. 14a, and a plurality of outlets similar to the ports 56 which are connected to port 57 of the supply valves.

Although the invention has been described hereinbefore with reference to the drawings as applied to a semi-trailer, the invention may be applied to other vehicles such as a full trailer, a tractor vehicle or an integrally powered load carrying vehicle.

We claim:

1. A vehicle braking system comprising a controller responsive to wheel speed signals for sensing skid conditions of the wheels and for generating skid control instructions, a primary fluid pressure supply including a fluid pressure source and a fluid pressure reservoir, a plurality of wheel brakes responsive to fluid pressure, hereinafter referred to as brake pressure, supplied thereto, a supply means, comprising a plurality of supply valves, each of which is adapted to supply brake pressure to a different wheel brake or brakes, from said primary supply in accordance with a brake operating signal, and a skid control means, controlled by said skid control instructions, comprising a plurality of skid control units, each of which is adapted to control the brake pressure of a different wheel brake or brakes, and first signal generating means to generate, independently of said skid control means, a plurality of said brake operating signals as a function of a brake command signal and to supply said brake operating signals to each of said supply valves, and all of said means are connected together so as to be mountable on the vehicle as a discrete unit.

2. A system according to claim 1 wherein the brake operating signals generated by said first signal generating means are derived from said brake pressure supplied from said primary supply.

3. A system according to claim 2 wherein the first signal generating means comprises a relay valve to modulate said brake pressure supplied from said primary supply as said function of the brake command signal.

4. A system according to claim 1 wherein the first signal generating means comprises a load sensing valve to modulate said brake command signal as a function of a load carried by the vehicle.

5. A system according to claim 1 comprising second signal generating means to generate a plurality of brake operating signals as a function of the brake pressure in said fluid pressure source falling below a predetermined pressure and to supply a brake operating signal for each of said supply valves and all said means being connected together so as to be mountable on the vehicle as said discrete unit.

6. A system according to claim 5 wherein the operating signals generated by said second signal generating means are derived from said brake pressure supplied from the reservoir and the brake command signal is derived independently of said reservoir.

7. A system according to claim 6 wherein the second signal generating means comprises a relay valve to modulate said brake pressure supplied from said reservoir as said function of said brake pressure in said pressure source.

8. A system according to claim 5 wherein the first and second signal generating means comprise a valve having a first port connected to said pressure source, a second port connected to said reservoir, a brake command signal port to receive said brake command signal, a plurality of brake operating signal outlet ports for brake operating signals and a valve member movable in response to at least one of the pressure of said brake command signal, and the pressure in said pressure source falling below said predetermined pressure, to modulate the brake pressure supplied at said second port to provide said brake operating signals.

9. A system according to claim 5 wherein the first and second signal generating means comprise a valve having a first port connected to said pressure source, a second port connected to said reservoir, a brake command signal port to receive said brake command signal, a plurality of brake operating signal outlet ports for brake operating signals and a valve member movable in response to at least one of the pressure of said brake command signal, and the pressure in said pressure source falling below said predetermined pressure, to modulate the brake pressure supplied at said second port to provide said brake operating signals wherein the supply valves are in-line supply valves and each brake operating signal is supplied to a brake operating signal inlet port of a respective in-line supply valve which has a brake pressure delivery port connected to an associated wheel brake or brakes and a respective skid control unit controls the brake pressure wherein said first and second signal generating means are provided within a first housing part provided with said first and second ports and having a brake operating signal chamber therein, said signal chamber having a plurality of brake operating signal outlet ports.

10. A system according to claim 9 wherein a plurality of second housing parts are provided, each second housing part providing therein one of said in-line supply valves and one of said skid control units to control said one in-line supply valve, each of said brake operating signal outlet ports being connected to the brake operating signal inlet port of a respective in-line supply valve.

11. A system according to claim 5 wherein the first and second signal generating means comprise a valve having a first port connected to said pressure source, a second port connected to said reservoir, a brake command signal port to receive said brake command signal, a plurality of brake operating signal outlet ports for brake operating signals and a valve member movable in response to at least one of the pressure of said brake command signal, and the pressure in said pressure source falling below said predetermined pressure, to modulate the brake pressure supplied at said second port to provide said brake operating signals wherein the supply valves are relay valves, and each brake operating signal is supplied to a brake operating signal inlet port of a respective skid control unit and an output of each skid control unit is connected to a control input of a respective supply relay valve, each supply relay valve having a brake pressure inlet port connected to said reservoir and a brake pressure delivery port connected on an associated wheel brake or brakes wherein said first and second signal generating means are provided within a first housing part provided with said first and second ports and having a brake operating signal chamber and a brake pressure supply chamber therein, said signal chamber having a plurality of brake operating signal outlet ports and said brake pressure supply chamber having a plurality of brake pressure outlet ports for said brake pressure.

12. A system according to claim 11 wherein a plurality of second housing parts are provided, each second housing part providing therein one of said supply relay valves and one of said skid control units to control said supply relay valve, each of said brake operating signal outlet ports being connected to the brake operating signal inlet port of the skid control unit and each of said brake pressure outlet ports being connected to the brake pressure inlet port of a respective supply valve.

13. A system according to claim 12 wherein said first housing part contains a control piston movably mounted in a control piston cylinder so that one side of the control piston is acted upon by the brake command signal, a secondary piston movably mounted in a secondary piston cylinder carried by the control piston and first resilient biasing means acting between said pistons normally to bias them apart, means to supply pressure fluid from said first port to said secondary piston cylinder to act on one side of the secondary piston to bias the secondary piston towards the control piston, the secondary piston carrying a valve seat adapted sealingly to engage with a valve member to control flow of said pressure fluid between the brake operating signal chamber and an exhaust passage, the valve member being movable relative to a further valve seat, towards which the valve member is normally resiliently biased by a second resilient biasing means, to control flow of said pressure fluid between the brake pressure supply chamber and the brake operating signal chamber, and communication means to permit fluid in said brake operating signal chamber to act on the other side of said control piston.

14. A system according to claim 1 wherein the supply valves are in-line valves, and each brake operating signal is supplied to a brake operating signal inlet port of a respective in-line supply valve which has a brake pressure delivery port connected to an associated wheel brake or brakes and a respective skid control unit controls the brake pressure.

15. A system according to claim 1 wherein the supply valves are relay valves, and each brake operating signal is supplied to a brake operating signal inlet port of a respective skid control unit and an output of each skid control unit is connected to a control input of a respective supply relay valve, each supply relay valve having a brake pressure inlet port connected to said reservoir and a brake pressure delivery port connected to an associated wheel brake or brakes.

16. A system according to claim 1 comprising second signal generating means to generate a plurality of brake operating signals as a function of the brake pressure in said pressure source falling below a predetermined pressure and to supply a brake operating signal for each of said supply valves and all said means being connected together so as to be mountable on the vehicle as said discrete unit and wherein said first and second signal generating means are provided within a first housing part and a plurality of second housing parts are provided each having therein one of said skid control units wherein said first housing part and each of said second housing parts each comprise a discrete housing and said discrete housings are releasably connected together to provide said discrete unit.

17. A system according to claim 16 wherein the first housing part is provided with a plurality of mounting surfaces for co-operation with a mounting surface of each second housing part to enable the first and second housing parts to be releasably connected together, the mounting surfaces are provided by ports of at least one interconnected pair of ports, the pairs of interconnected ports between the first housing part and a respective second housing part being laterally spaced and the ports of one of said pairs being interconnected to accommodate lateral variation in the juxtaposition of the ports of said one pair and the ports of the other of said pairs being interconnected to accommodate variation in the juxtaposition of the ports of said other pair in a direction normal to said lateral direction.

18. A system according to claim 1 wherein a fluid flow control structure is provided to influence the flow of fluid between at least two of said supply valves, said skid control means, and said first signal generating means.

19. A system according to claim 18 wherein the fluid flow control structure comprises a flow damping structure to permit restricted flow in at least one direction and the fluid flow control structure is provided by a device comprising means defining a chamber having an entry port and an exit port, a valve member movable therein towards and away from a valve seat defined by a continuous loop surface surrounding an exit passage connected to said exit port and disposed on the opposite side of the valve member to the entry port, means to limit movement to the valve member towards the valve seat and means to permit of limited flow of fluid past the valve member whereby, when the rate of fluid flow demanded exceeds said limited flow the resultant pressure on the valve member moves the valve member to a position adjacent the valve seat to provide, in co-operation with the valve seat, a restriction to fluid flowing from the entry port towards the exit port, whilst fluid flow in the reverse direction causes said valve member to move away from the valve seat to permit of flow of fluid in said reverse direction which is unrestricted by said co-operation between the valve member and the valve seat.

20. A valve unit for a vehicle braking system comprising a first housing part containing a signal generating means to generate a plurality of brake operating signals as a function of a brake command signal and comprising a brake operating signal chamber and a plurality of brake operating signal outlet ports and a plurality of second housing parts, each containing a supply valve responsive to a brake operating signal to supply brake pressure to at least one respective wheel brake and a skid control unit to control the supply of brake pressure by said supply valve and having a brake operating signal inlet port and a brake pressure delivery port, each of said second housing parts being removably mounted on the first housing part with said brake operating signal inlet and outlet ports interconnected.

21. A valve unit according to claim 20 wherein said first housing part contains a second signal generating means to generate a plurality of brake operating signals as a function of the fluid pressure in a fluid pressure source falling below a predetermined pressure.

22. A valve unit according to claim 21 wherein the supply valves are in-line valves and the brake operating signal outlet ports are connected to a brake operating signal inlet port of a respective in-line valve and a respective skid control unit modulating the brake operating signal to provide the brake pressure, each of said in-line supply valves having a brake pressure delivery port connected to an associated wheel brake or brakes.

23. A valve unit according to claim 21 wherein the supply valves are relay valves and the brake operating signal outlet ports are connected to a brake operating signal inlet port of a respective skid control unit and an output of each skid control unit is connected to a control input of a respective supply relay valve, each supply relay valve having a brake pressure inlet port connected to a reservoir and a brake pressure delivery port connectable to an associated wheel brake or brakes.

24. A valve unit according to claim 23 wherein the first housing part comprises a brake pressure supply chamber having a plurality of brake pressure outlet ports and each of said second housing parts has a brake pressure inlet port and is mounted so that said brake pressure inlet and outlet ports are interconnected.

* * * * *